US009962848B2

(12) United States Patent
Posarelli et al.

(10) Patent No.: US 9,962,848 B2
(45) Date of Patent: May 8, 2018

(54) APPARATUS AND METHOD FOR WEEDING A MULTILAYER SHEET COMPRISING A SUPPORT LINER AND AT LEAST ONE ADHESIVE FILM COUPLED WITH THE LINER

(71) Applicant: Esanastri S.r.l., Calcinaia (Pisa) (IT)

(72) Inventors: Roberto Posarelli, Calcinaia (IT); Giuliano Vegni, Calci (IT); Cesare Stefanini, Vicopisano (IT); Federico Carnasciali, Pisa (IT); Giorgio Dinelli, Viareggio (IT); Andrea Di Lupo, Vicopisano (IT)

(73) Assignee: ESANASTRI S.R.L., Calcinaia (Pisa) (IT)

( * ) Notice: Subject to any disclaimer, the term of this patent is extended or adjusted under 35 U.S.C. 154(b) by 325 days.

(21) Appl. No.: 14/437,671

(22) PCT Filed: Oct. 23, 2013

(86) PCT No.: PCT/IB2013/059576
§ 371 (c)(1),
(2) Date: Apr. 22, 2015

(87) PCT Pub. No.: WO2014/068450
PCT Pub. Date: May 8, 2014

(65) Prior Publication Data
US 2015/0290825 A1    Oct. 15, 2015

(30) Foreign Application Priority Data

Oct. 29, 2012 (IT) ................ FI2012A0232
Oct. 29, 2012 (IT) ................ FI2012A0233
Oct. 29, 2012 (IT) ................ FI2012A0234

(51) Int. Cl.
B26D 3/28    (2006.01)
B26D 5/30    (2006.01)
(Continued)

(52) U.S. Cl.
CPC ............... *B26D 3/28* (2013.01); *B26D 1/045* (2013.01); *B26D 3/085* (2013.01); *B26D 5/007* (2013.01);
(Continued)

(58) Field of Classification Search
CPC ........ B26D 7/1854; B26D 3/085; B26D 7/18; Y10T 156/1168; Y10T 156/19;
(Continued)

(56) References Cited

U.S. PATENT DOCUMENTS 5,106,138 A * 4/1992 Lawson ............... B25J 15/0253
29/743
6,102,097 A    8/2000 Stempien
(Continued)

OTHER PUBLICATIONS

International Search Report dated Apr. 2, 2014 for PCT/IB2013/059576.

*Primary Examiner* — Linda L Gray
(74) *Attorney, Agent, or Firm* — Lucas & Mercanti, LLP

(57) ABSTRACT

The present invention concerns the field of graphic apparatuses and in particular its object is an apparatus and a relative method for the so-called "weeding" of plastic or paper films having or more self-adhesive, double sided adhesive or electrostatic layers coupled with a support liner treated with a non-stick agent. The apparatus comprises analysis and cutting means adapted to map and execute weeding assisting cuts.

22 Claims, 27 Drawing Sheets

(51) Int. Cl.
  *B32B 38/10* (2006.01)
  *B26D 1/04* (2006.01)
  *B26D 3/08* (2006.01)
  *B26D 5/00* (2006.01)
  *B26D 5/32* (2006.01)
  *B26D 5/34* (2006.01)
  *B26D 7/01* (2006.01)
  *B26D 7/18* (2006.01)
  B25J 15/10 (2006.01)
  B44C 1/16 (2006.01)

(52) U.S. Cl.
  CPC .............. *B26D 5/32* (2013.01); *B26D 5/34* (2013.01); *B26D 7/018* (2013.01); *B26D 7/18* (2013.01); *B26D 7/1854* (2013.01); *B25J 15/10* (2013.01); *B32B 38/10* (2013.01); *B44C 1/16* (2013.01); *Y10T 83/0296* (2015.04); *Y10T 156/1168* (2015.01)

(58) Field of Classification Search
  CPC .......... Y10T 156/196; Y10T 156/1994; Y10T 83/0296; B32B 43/996; B32B 38/10; B32B 2451/00; B32B 2519/00; B25J 15/0028; B25J 15/0033; B25J 15/0057; B25J 15/10; B25J 19/0091; B44C 1/16
  See application file for complete search history.

(56) References Cited

U.S. PATENT DOCUMENTS

| 6,575,218 B1* | 6/2003 | Burns | B22F 3/005 156/248 |
| 2007/0261783 A1* | 11/2007 | Larson | B29C 63/0013 156/247 |

* cited by examiner

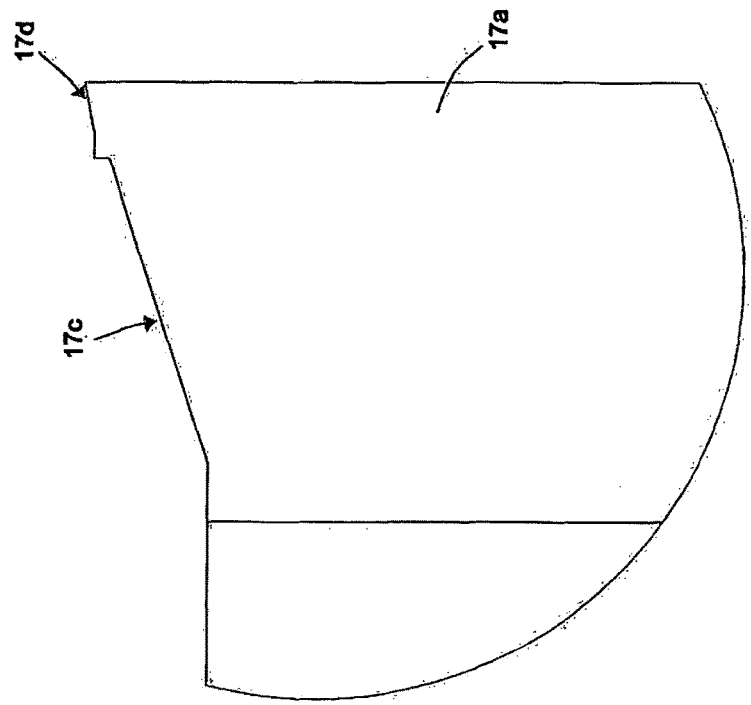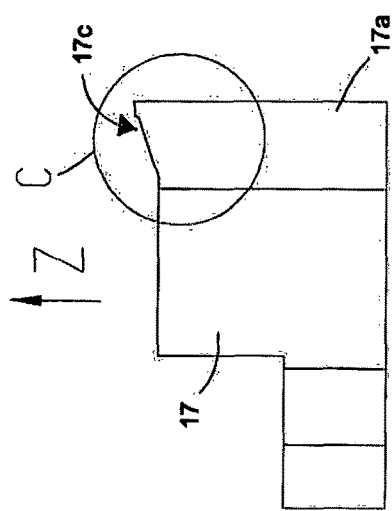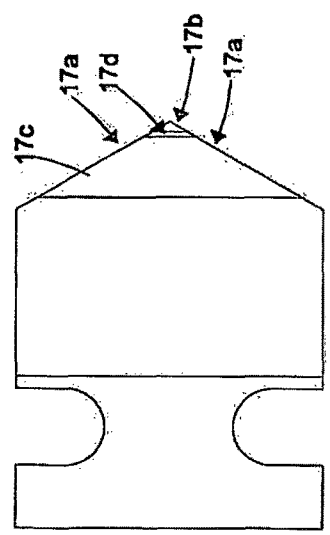

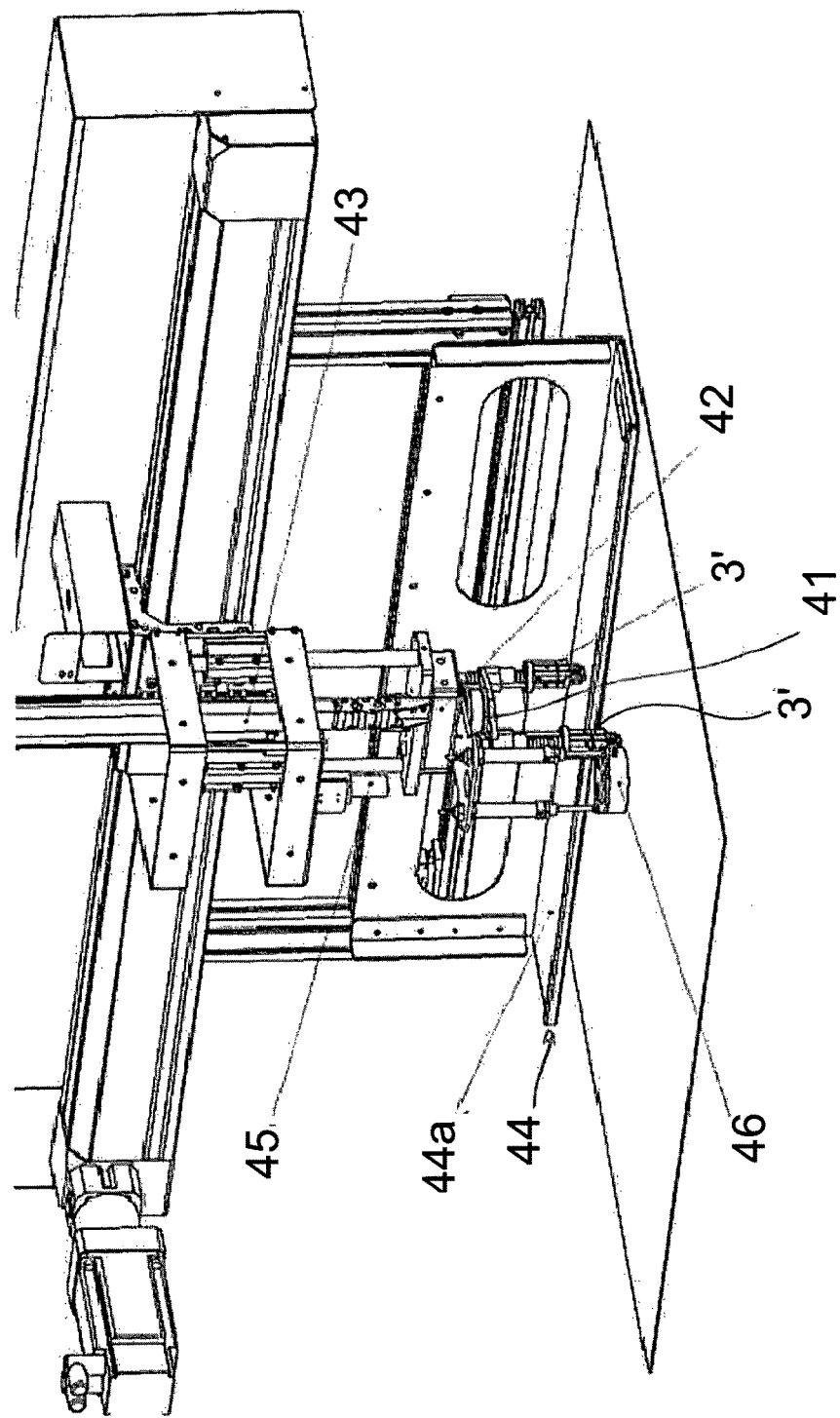

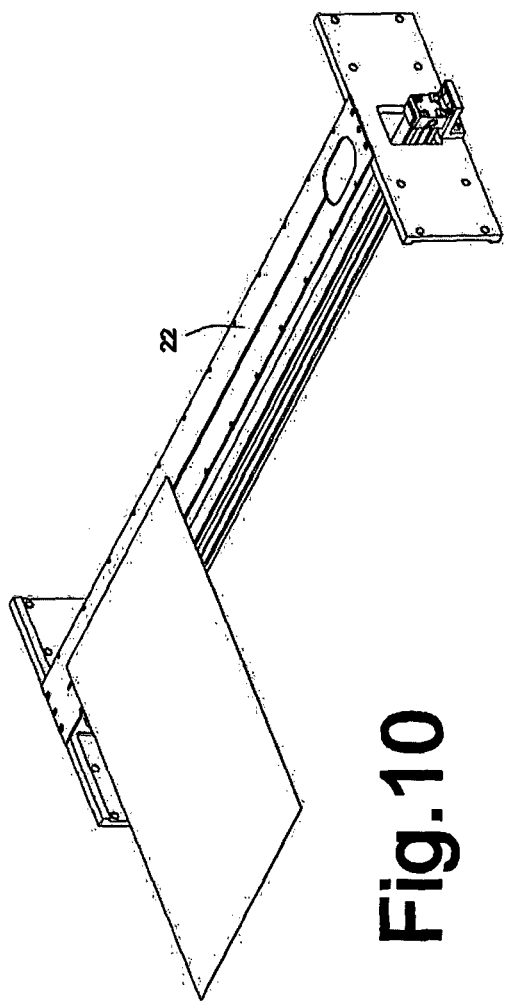
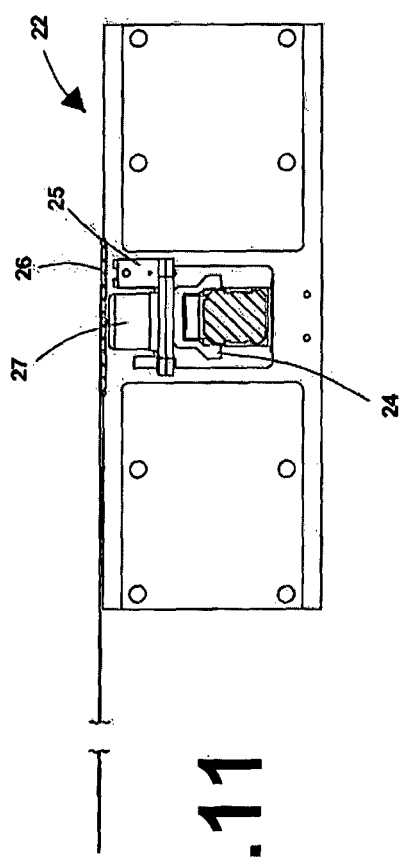
Fig.10
Fig.11

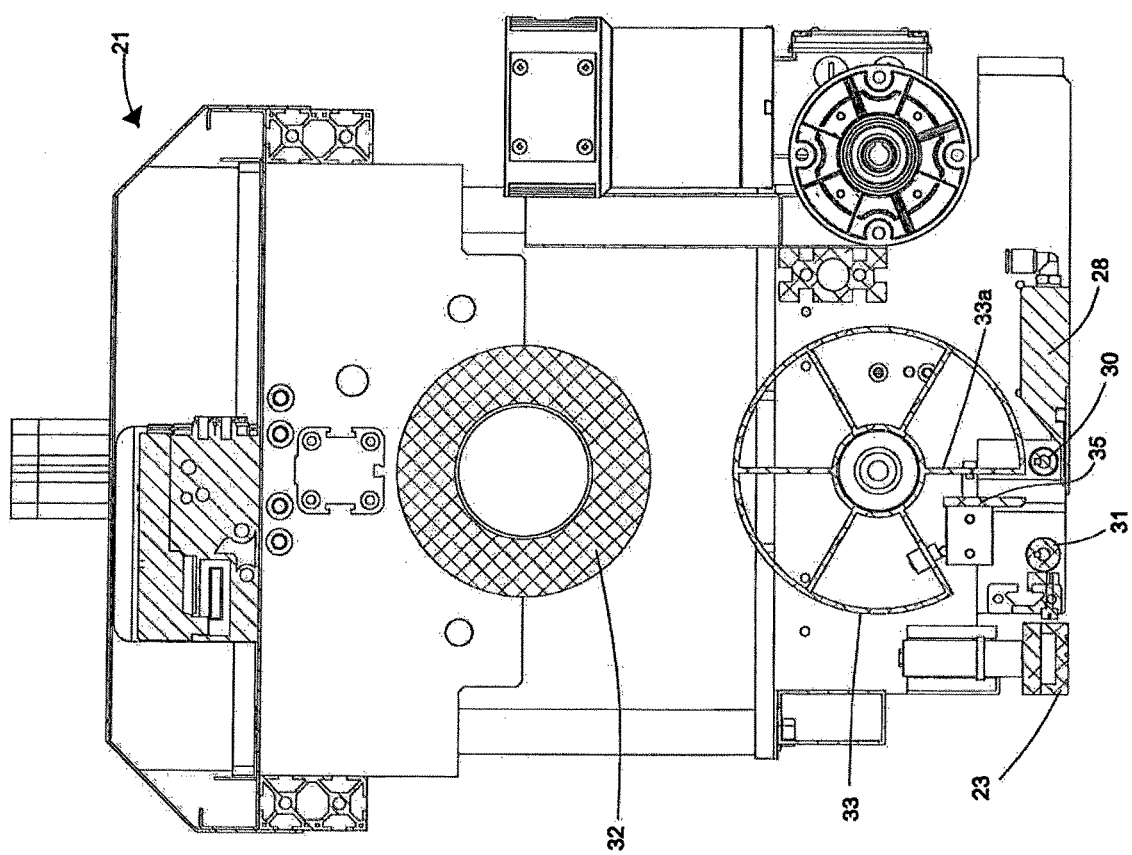

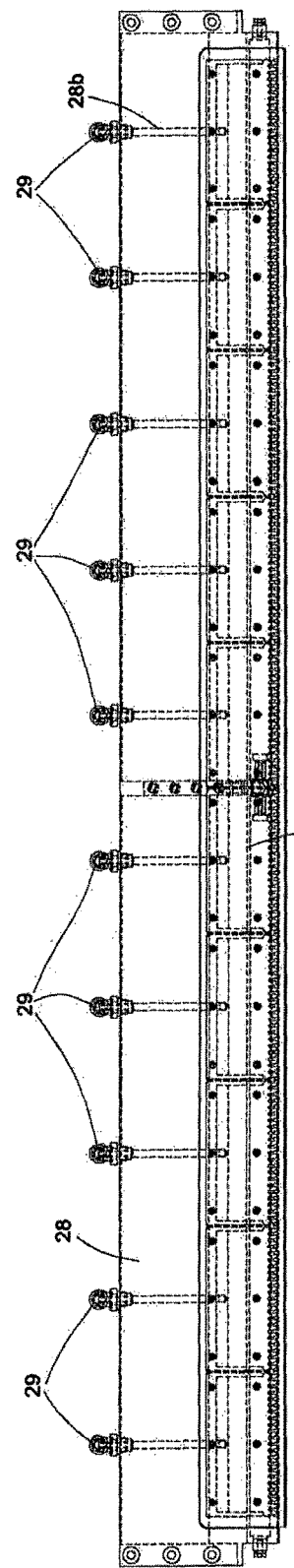
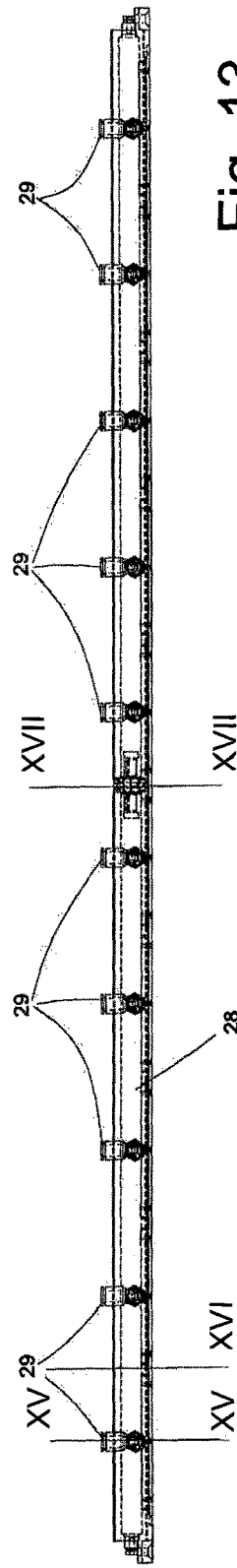
Fig. 14
Fig. 13

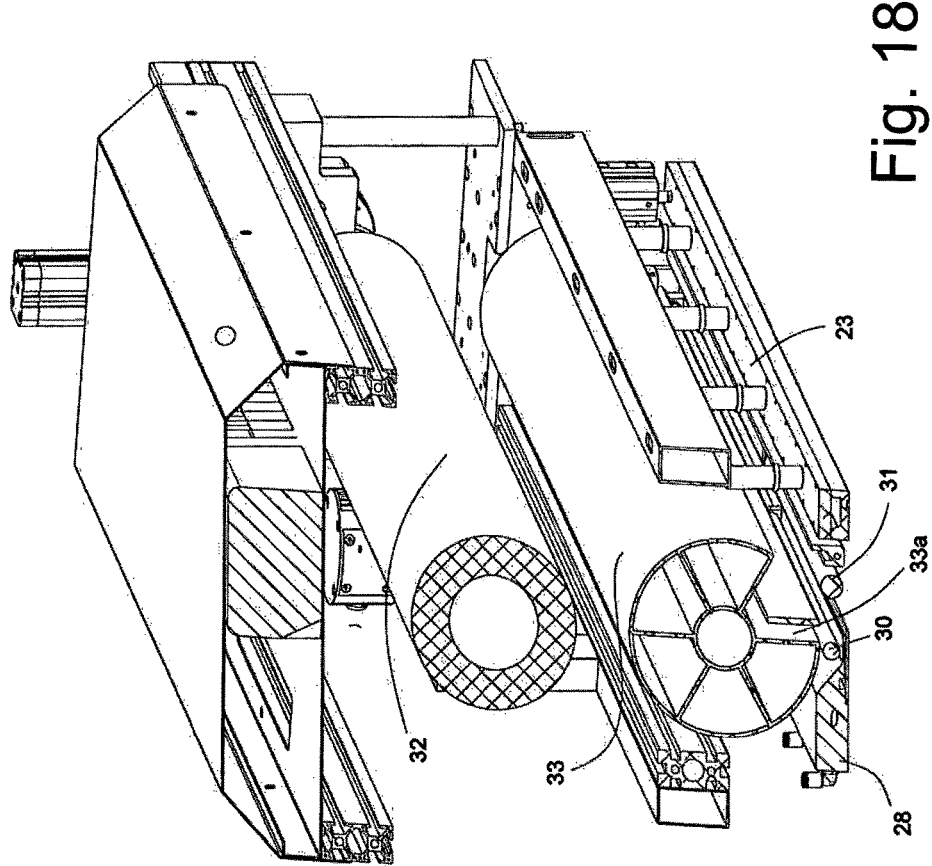

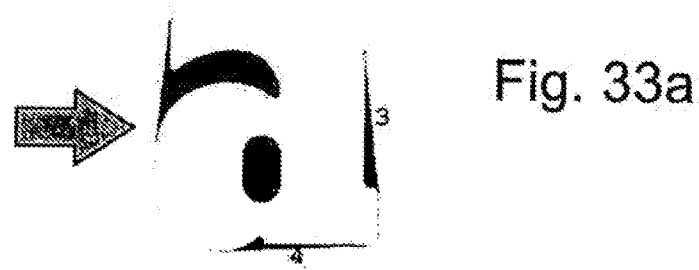
Fig. 33a
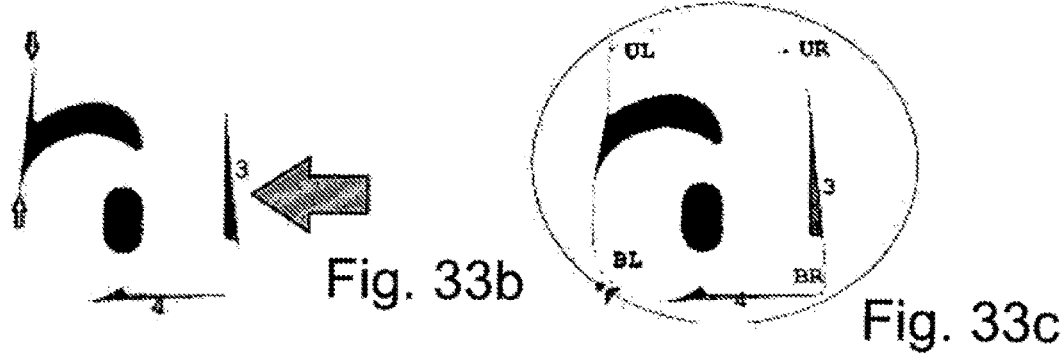
Fig. 33b
Fig. 33c
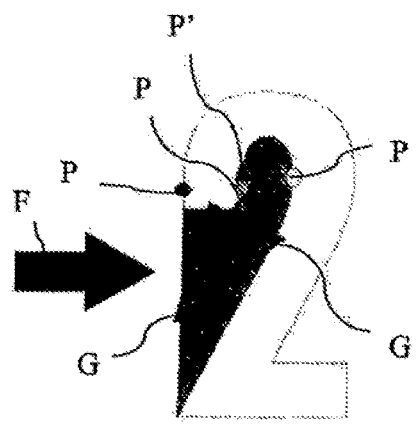
Fig. 34a
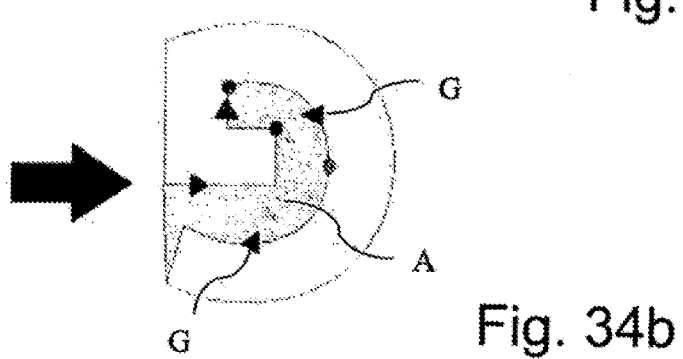
Fig. 34b

APPARATUS AND METHOD FOR WEEDING A MULTILAYER SHEET COMPRISING A SUPPORT LINER AND AT LEAST ONE ADHESIVE FILM COUPLED WITH THE LINER

CROSS-REFERENCE TO RELATED APPLICATIONS

This application is a 371 of PCT/IB2013/059576, filed Oct. 23, 2013 which, in turn, claimed the priority of Italian Patent Application No. FI2012A000232 filed on Oct. 29, 2012, claimed the priority of Italian Patent Application No. FI2012A000233 filed on Oct. 29, 2012, and claimed the priority of Italian Patent Application No. FI2012A000234 filed on Oct. 29, 2012, all applications are incorporated herein by reference.

TECHNICAL FIELD OF THE INVENTION

The present invention concerns the field of graphic apparatuses and in particular its object is an apparatus and a relative method for the so-called "weeding" of plastic or paper films having or more self-adhesive, double sided adhesive or electrostatic layers coupled with a support liner treated with a non-stick agent.

BACKGROUND OF THE INVENTION

In the preparation of adhesive graphics, simply decorative or also having a protective function, obtained through various printing or through simple engraving processes, a distribution of single graphics is obtained on a single sheet comprising films of the type indicated above, printed and/or cut, coupled with a supporting silicone release paper, or liner. A cutting machine thus has the function of cutting the fringes of the various programmed drawings or writings only on the film, without however cutting also the support/release paper. At this stage there is the need of removing the "weeds", that is, the parts of adhesive film which are not processed and are therefore outside the graphics. In fact, the subsequent user, for his production requirements, needs to have a sheet in which there are only the graphics on the support paper, so that the same graphics can be easily removed and applied as desired.

Such a removal operation of the superfluous film, on the whole also called "weed" for the sake of simplicity, is in fact called weeding. This is a very onerous operation and at the same time delicate since, especially when the contours of the graphics have irregular shapes, or in any case they have indentations or acute curves or undercuts (situation which occurs even with simple alphanumerical characters), the film of weed to be removed tends to tear, leaving residues, or to pull away also the graphical part that should instead be left unaltered. There are also often small parts, typically the internal hollows of characters and writings in general, which require operations that are accurate, precise and repeated.

Such an operation is currently carried out in a completely manual manner, with serious affection of the production time and on labor costs. Automation of the weeding process, despite the attempts made, has been found to be problematic, indeed for the difficulties mentioned above, furthermore enhanced by the fact that the different graphics to be treated and their distribution demand requirements that are always different.

SUMMARY OF THE INVENTION

The present invention, on the other hand, provides a response to this strongly felt need, by providing a series of surprisingly effective technical expedients that make possible to achieve a weeding system that obtains a fully effective result, capable of replacing the manual methods currently in use, with consequent remarkable advantages.

The essential features of a weeding apparatus and method according to the invention are defined in the respective independent claims here annexed. Other advantageous features, in connection with preferred or in any case effective embodiments, are the subject of the different dependent claims.

BRIEF DESCRIPTION OF THE DRAWINGS

Characteristics and advantages of the weeding apparatus and method according to the present invention will become apparent from the following description of embodiments thereof, made purely by way of example and not limitative, with reference to the attached drawings in which:

FIGS. 7a and 7b show respectively from a side and from above a pinching block of the jaw of FIG. 6;

FIG. 7c is an enlarged detail of the inside of circle C of FIG. 7a;

FIG. 8 and FIG. 9 schematically depict, respectively in an axonometric view and in front view, a fine weeding device according to a different embodiment of the invention;

FIG. 10 and FIG. 11 represent, respectively in an axonometric and a side view, a cutting device used in the apparatus according to the invention;

FIG. 12 is a sectional view taken along a longitudinal plane of the apparatus of a seizing head of a rough weeding device according to the invention;

FIGS. 13 and 14 are, respectively, a front view and a top plan view of a blower of the rough weeding head of FIG. 12;

Figure 20:
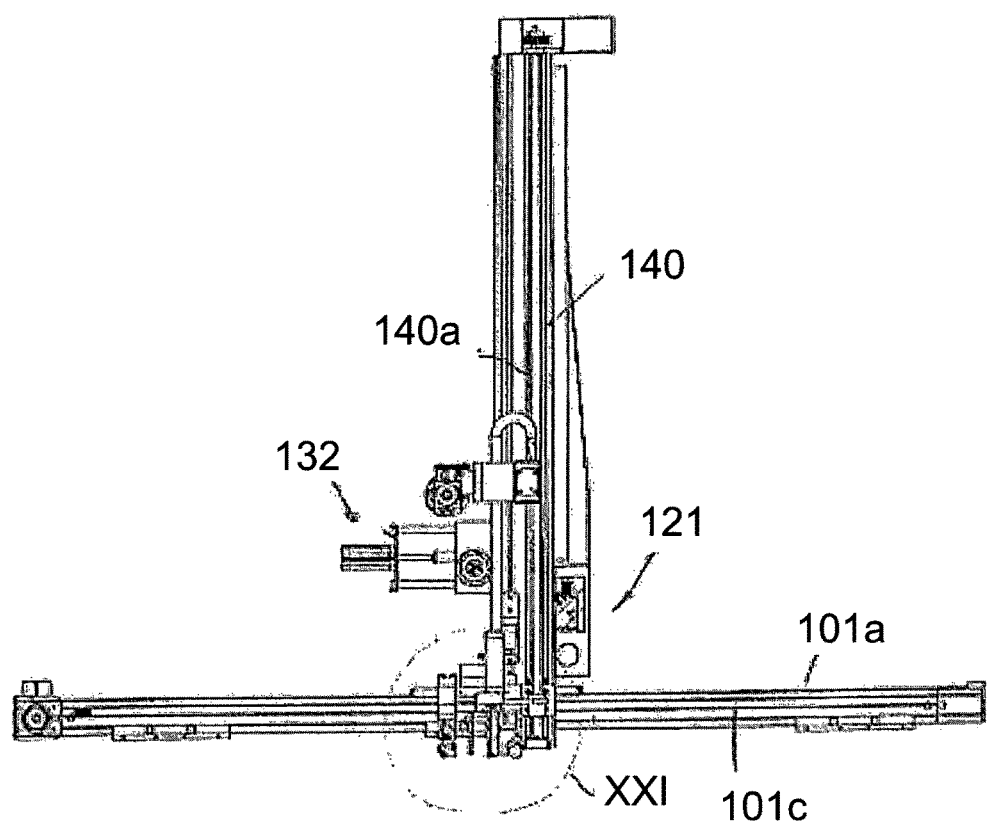
Figure 21:
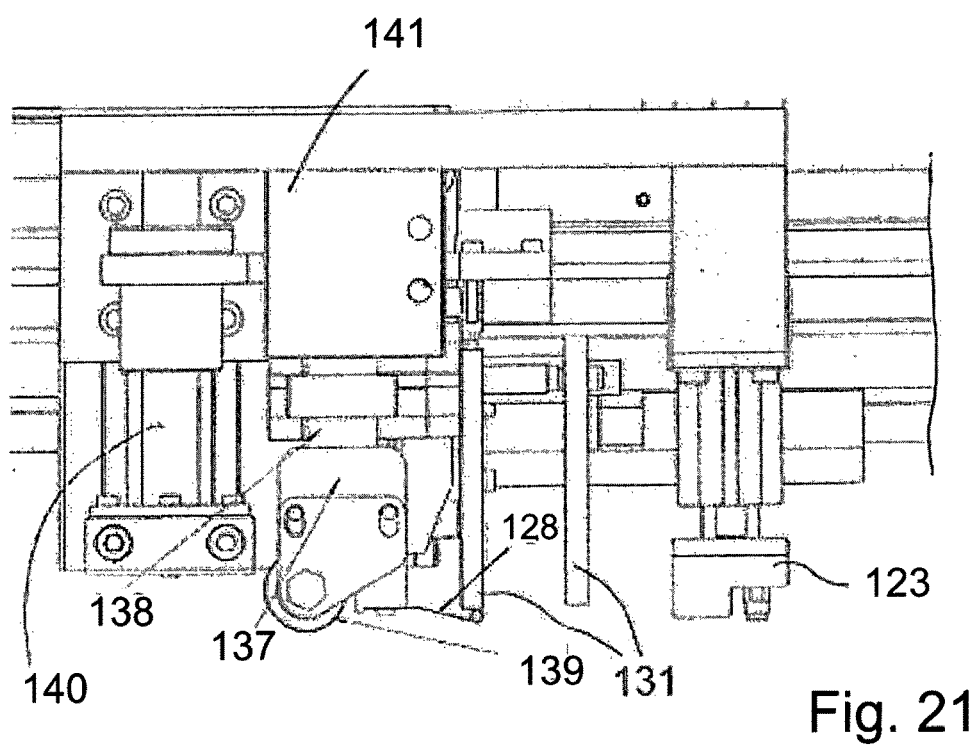
Figure 22:
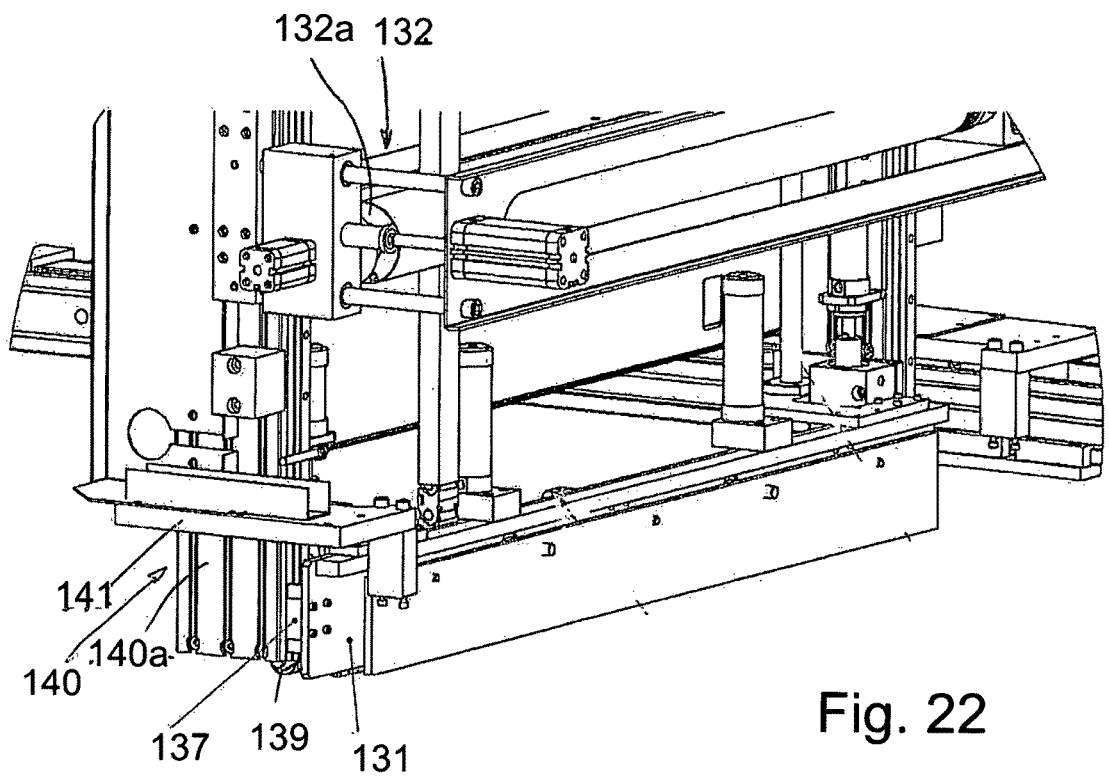
Figure 23:
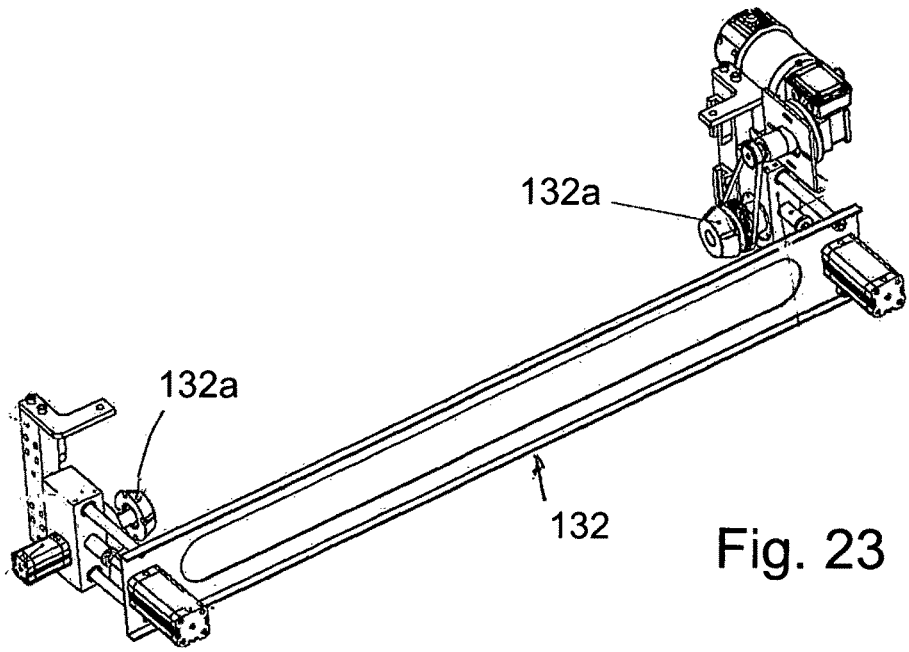
Figure 24:
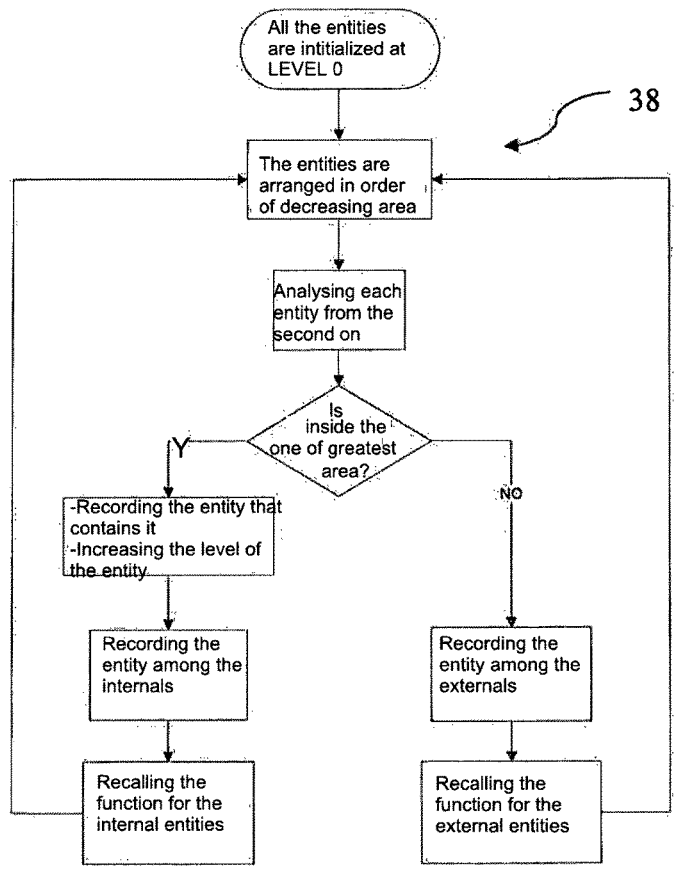
Figure 25:
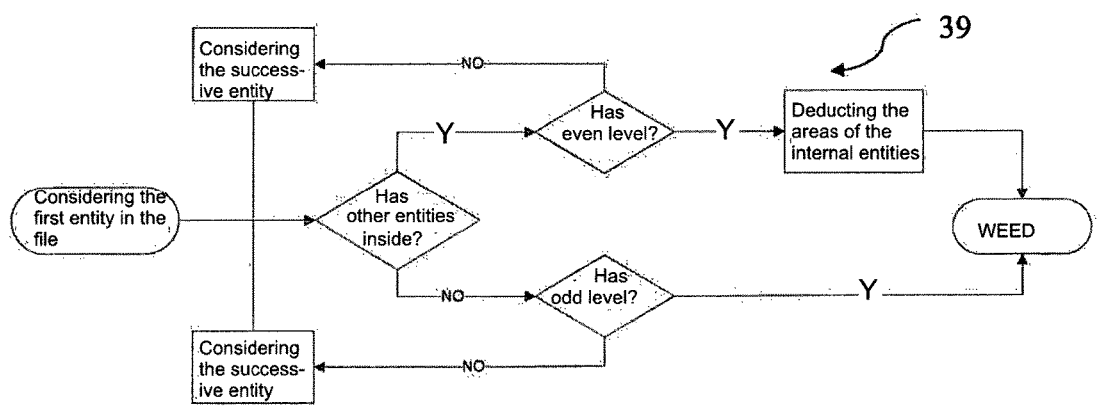
Figure 26:
Figure 27:
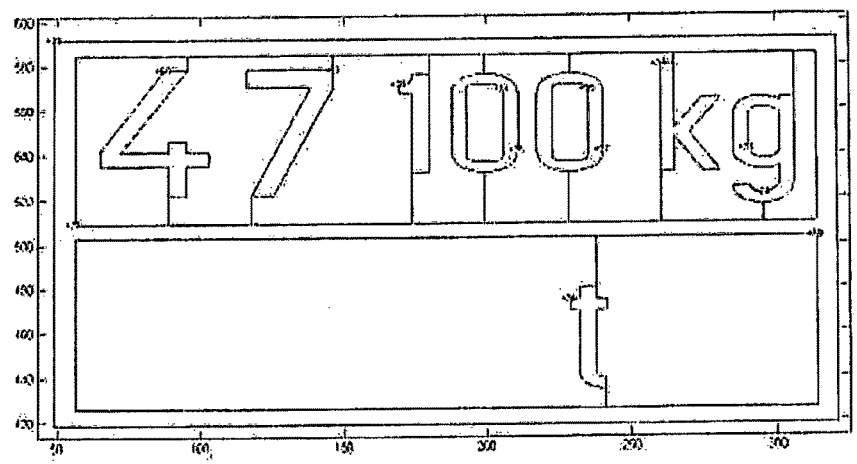
Figure 28:
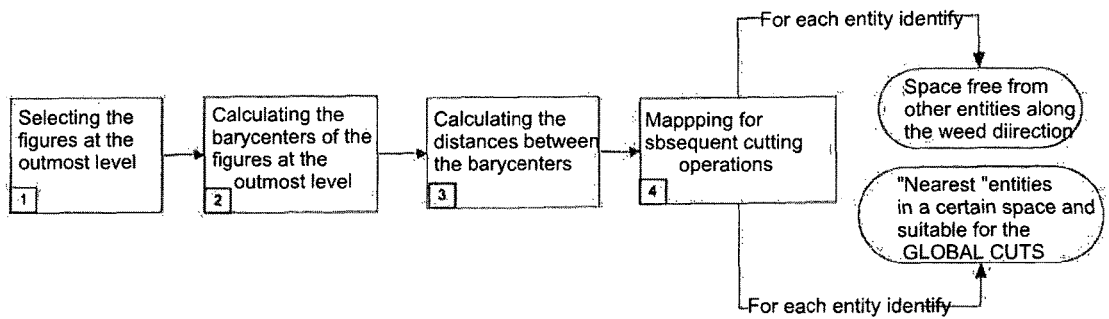
Figure 29:
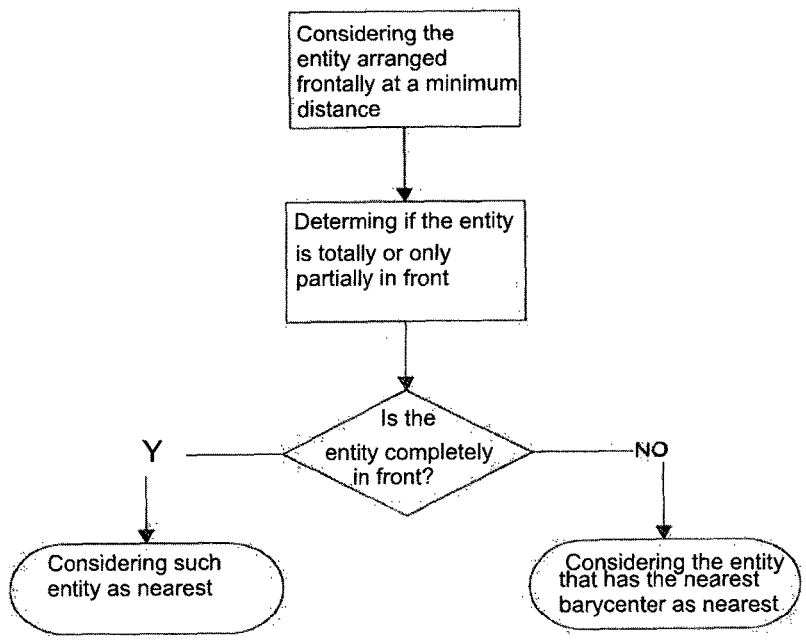
Figure 31:
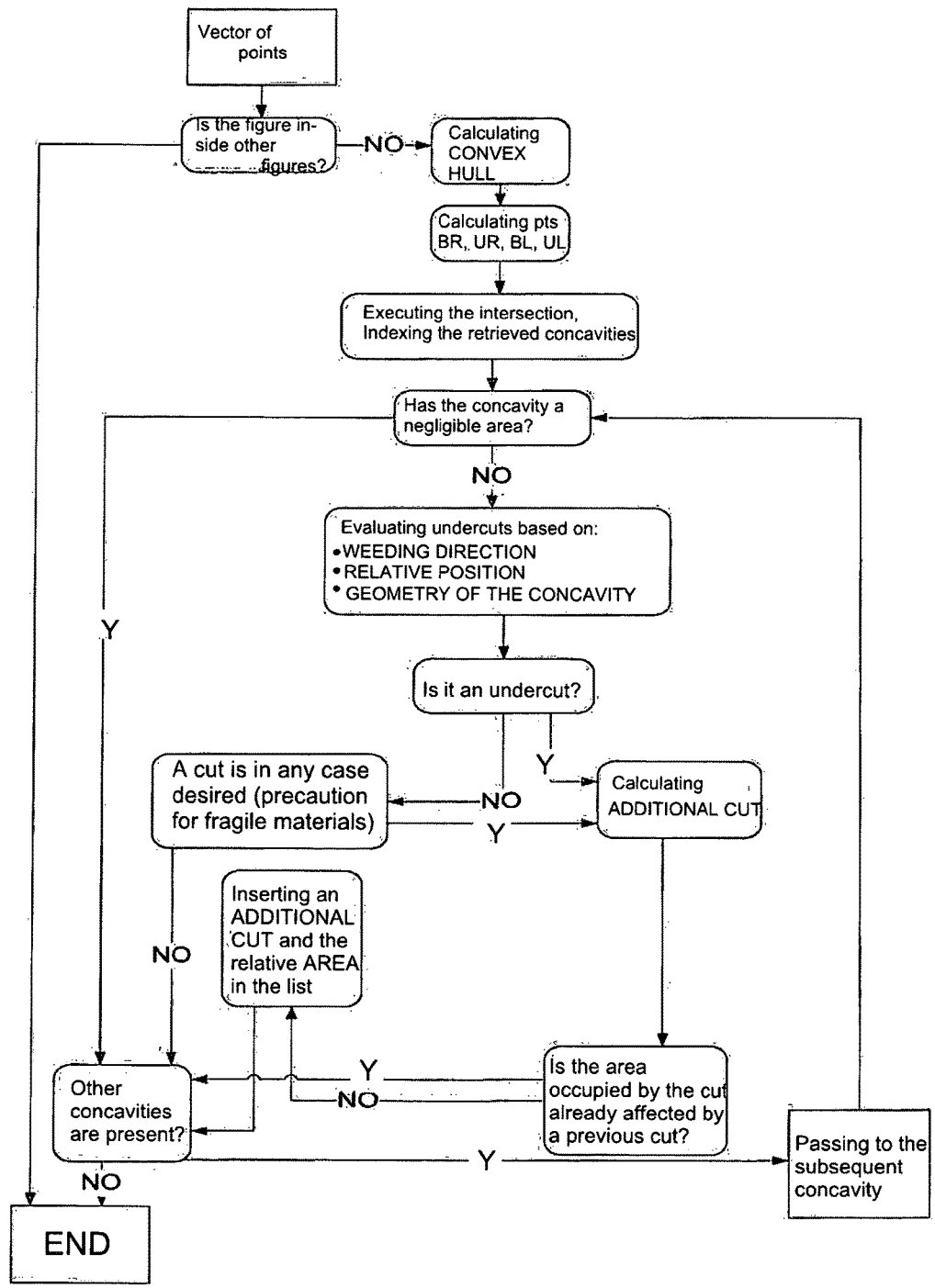
Figure 35:
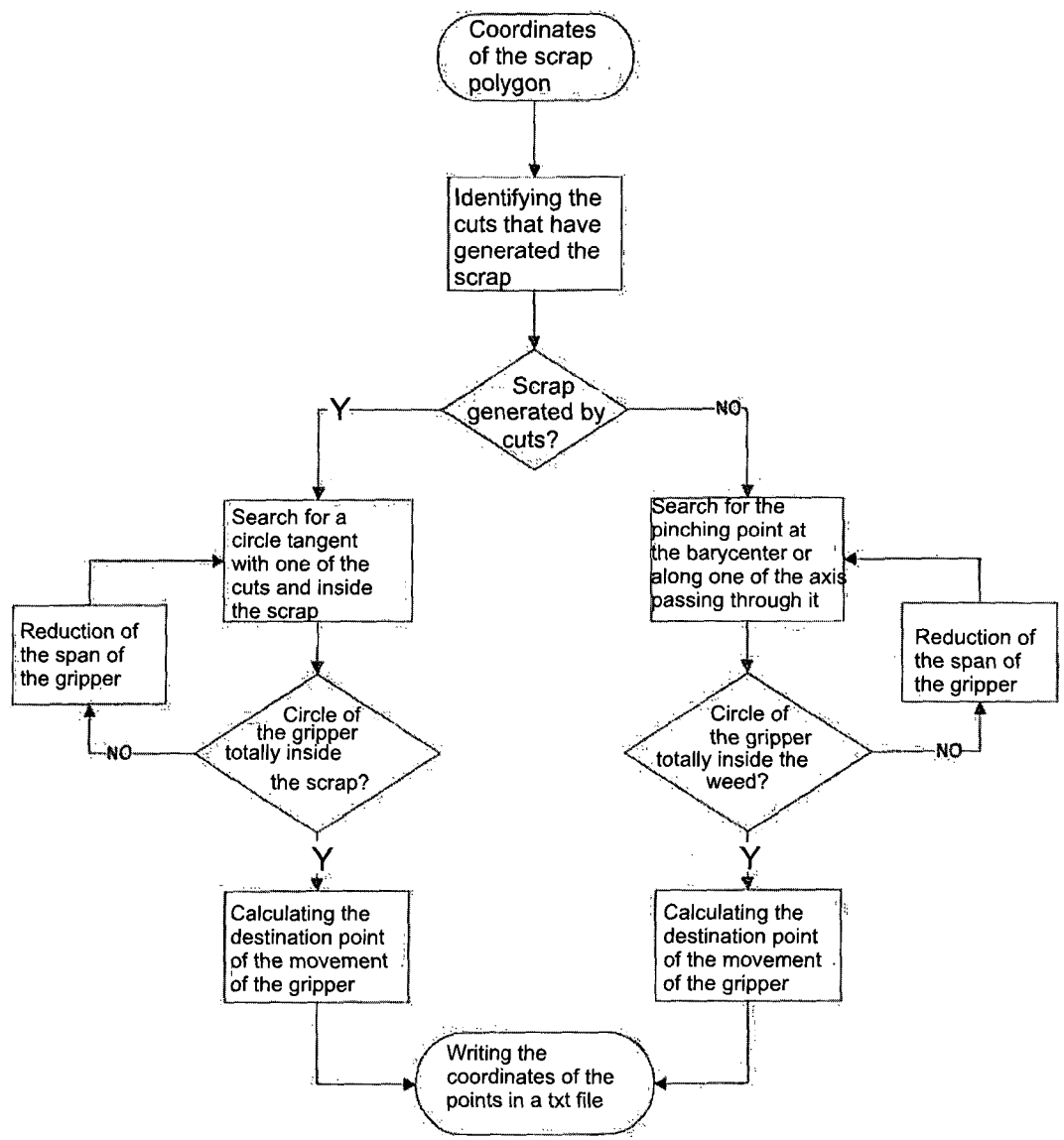
Figure 36:
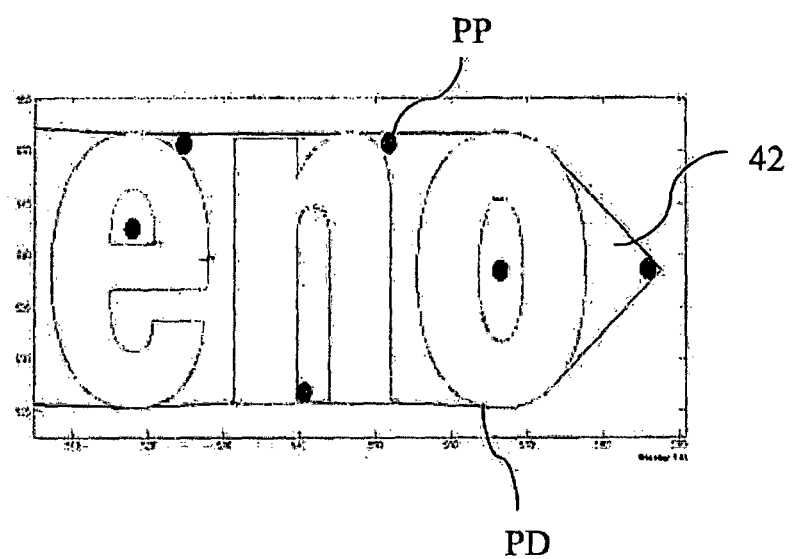

figures from 15 to 17 are cross-section views of the blower in the previous figures, taken respectively along the lines XV, XVI e XVII of FIG. 13;

FIG. 18 is a further representation, in this case partial, schematic, broken and axonometric, of the rough weeding head; and figures from 19a to 19j represent schematically respective subsequent stages of the rough weeding process;

FIG. 20 is a side view of the rough weeding device according to a different embodiment of the invention;

FIG. 21 is an enlarged representation, but mirrored, of the area inside the circle XXI of FIG. 20;

FIG. 22 is an axonometric view of substantially the same component (seizing head) shown in FIG. 21;

FIG. 23 represents in isolation and in axonometric view a weed collection unit in accordance with the second embodiment of the invention;

FIGS. 24 and 25 are flow charts that illustrate a first operational step, for defining the levels and identifying the main or "native" weed, of a weeding method with weeding assisting cuts according to the invention;

FIGS. 26 and 27 are representations of parts of sheet being weeded with the relative graphics and, in FIG. 27, the indication of cuts internally dividing the main or "native" weed according to the invention;

FIGS. 28 and 29 are further flow charts that depict a different operational step of the method, in connection with the search and the mapping of additional global weeding cuts, i.e. cuts between one graphic element and another;

figures from 30a to 30d show various graphics for illustrating examples of operational steps of the method in the search and mapping steps of the additional global cuts of the weed;

FIG. 31 is a flow chart of an operational step of the method in connection with searching for local cuts, i.e. cuts that peripherally edge single graphic elements;

figures from 33a to 33c are examples of a graphic element with the identification of possible critical issues in the rough weeding operation;

FIGS. 34a and 34b are further examples of graphic elements that illustrate the undercut-type critical issues;

FIG. 35 is a flow chart that represents a final step of the method, according to which optimal pinching points are identified for controlling the fine weeding gripper; and FIG. 36 shows an example of graphic element with the representation of assisting cuts and relative pinching points of the fine weeding gripper.

DETAILED DESCRIPTION OF THE INVENTION

With reference to said figures, an apparatus according to the invention is intended to automatically remove the weed, which advantageously undergoes a pre-emptive cutting operation, with suitably positioned assisting cuts that are added to the conventional ones that define the periphery/outline of the various graphic elements. The cuts, carried out with conventional plotters, in turn have the characteristic of cutting the self-adhesive, adhesive or electrostatic, plastic or paper film, without affecting the support paper or liner. This particular aspect of the invention will be considered in detail further on, and for the time being focus will be made on the actual weeding apparatus, per se provided with novel and advantageous structural and functional characteristics that determine in turn and intrinsically other aspects of the invention.

The apparatus comprises a frame 1 equipped with a top plane 1a on which through known pneumatic systems the sheets of material to be weeded are fed and moved forward. Upstream of the plane there is arranged a feeder 2, advantageously having a lifting surface, with a motorised control, on which to position the sheets with dimensions that can vary from 200×300 mm to 1000×1400 mm or also reels having corresponding size. The plane 2a of the feeder can comprise, along two consecutive sides, mechanical abutments that are suitable for allowing a reference of the sides of the sheet, the so-called "print register" sides. This, along with the control of the height of the plane, ensures that when a stack of sheets is arranged on the plane, the sheet on top, intended to be processed, is always positioned perfectly with respect to the work plane 1a of the frame 1.

Figure 1:
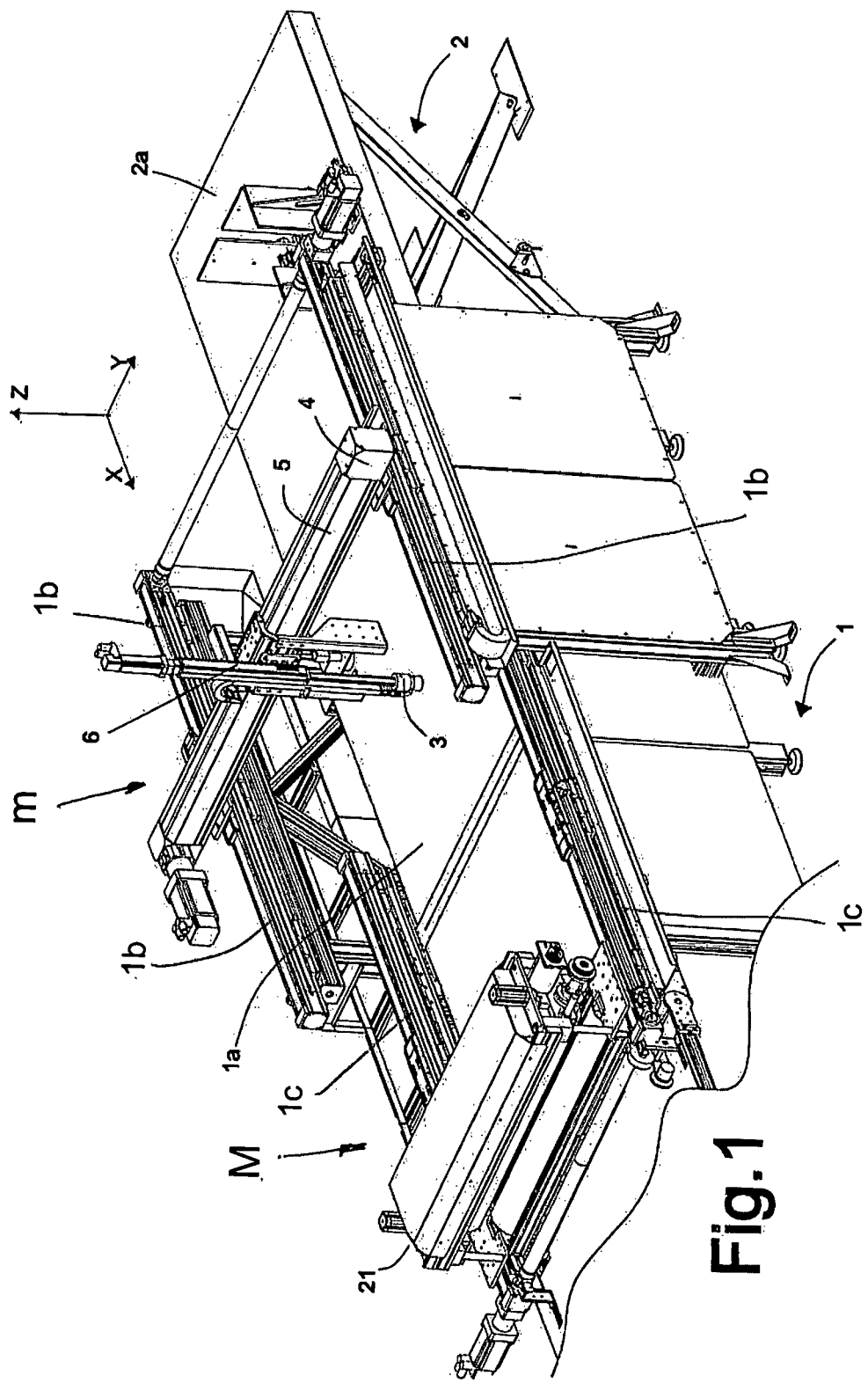
FIG. 1 is a schematic axonometric view of an automatic weeding apparatus.
Figure 2:
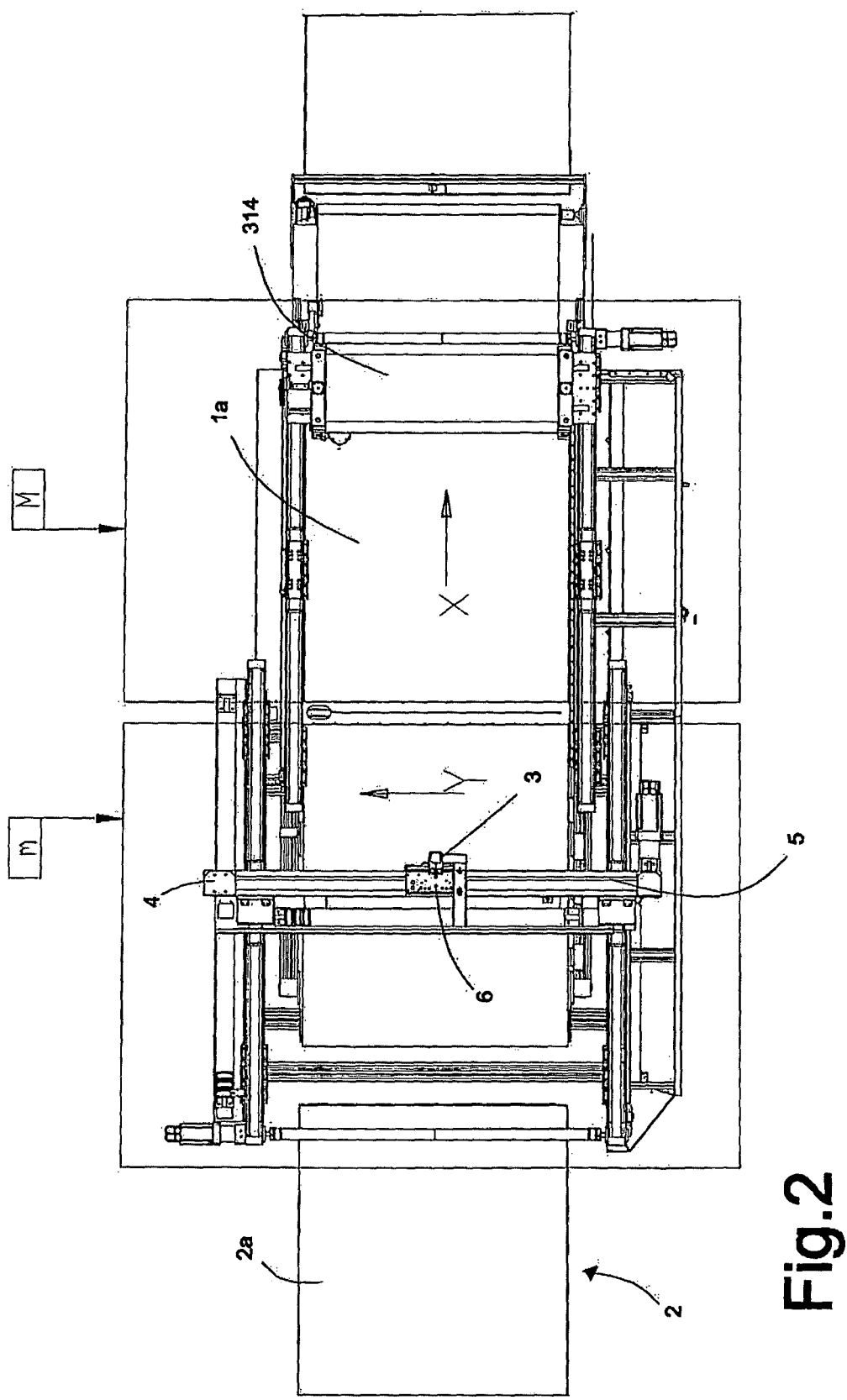
FIG. 2 is a top plan view of the apparatus.

A first part of the plane 1a, taking as a reference the advancement direction of the material indicated with the arrow X of FIG. 2, represents a fine weeding station m, that is a station of fine removal of small parts of weed, including those parts that are generated by a plurality of weeding assisting cuts. Once the fine weeding has been carried out, the main body of the weed (through a rough weeding station/process M which will be described in greater detail hereafter) can be detached completely and effectively, without leaving residues, without tearing material or removing undesired parts.

A fine weeding device operates at the fine weeding station m (FIG. 2), with a gripper 3 that a portal 4 supports in a vertical arrangement, allowing the gripper to move along the three coordinates XYZ, in which the plane XY is the one parallel to the plane 1a and the axis Z is the direction along which the gripper 3 extends.

To such a purpose the portal 4 has a crosspiece 5 which can be displaced along the advancement direction X and along which a carriage 6 moves, in accordance with the direction Y, and in turn supports the fine weeding gripper 3 through a linear actuation system along the direction Z. All such movements, just like those that are not specified otherwise, are controlled by motorizations implemented as obvious to a person skilled in the art. It is in any case worth noting how the movement along Z of the gripper 3 is advantageously carried out by means of a recirculating ball system driven by a direct brushless motor that ensures speed and precision with a repeatability in the order of a hundredth of a millimeter.

The portal 4 also has a suction rod, which is not visible in the figures, which through a suction pad system feeds the sheet and arranges it so as to align the front left corner (imagining an observer which is standing looking towards the same direction as the advance movement direction) with a suitably pre-set reference. During transport the sheet remains lifted in the front part that is gripped by the suction pads but is progressively made to adhere to the plane 1a in the remaining part towards the tail. The plane 1a is indeed connected to a vacuum pump system and the friction of the sheet created by the suction during movement ensures a perfect flatness preventing air bubbles or creases from forming on the sheet itself.

Once the sheet has been positioned on the suction work plane at the fine weeding station m, the gripper 3 can carry out the fine removal of the various (small) weed parts, including those created by the plurality of weeding assisting cuts, according to the instructions from the control system, in turn processed on the basis of technical criteria that shall be further explained hereafter.

Figure 4:
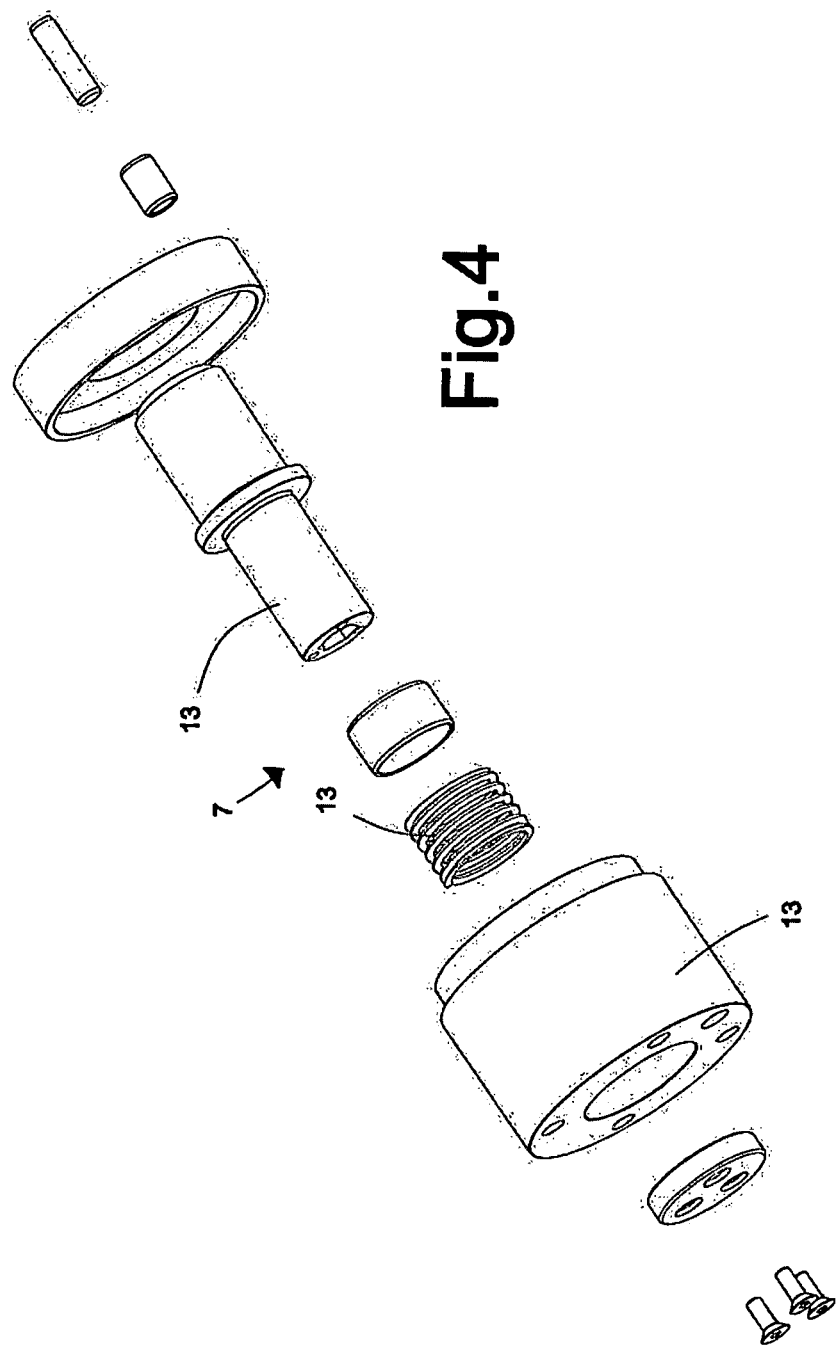
FIGS. 4 and 5 are axonometric exploded views of respective parts of the gripper of FIG. 3, in particular a damper and a pinching head.
Figure 5:
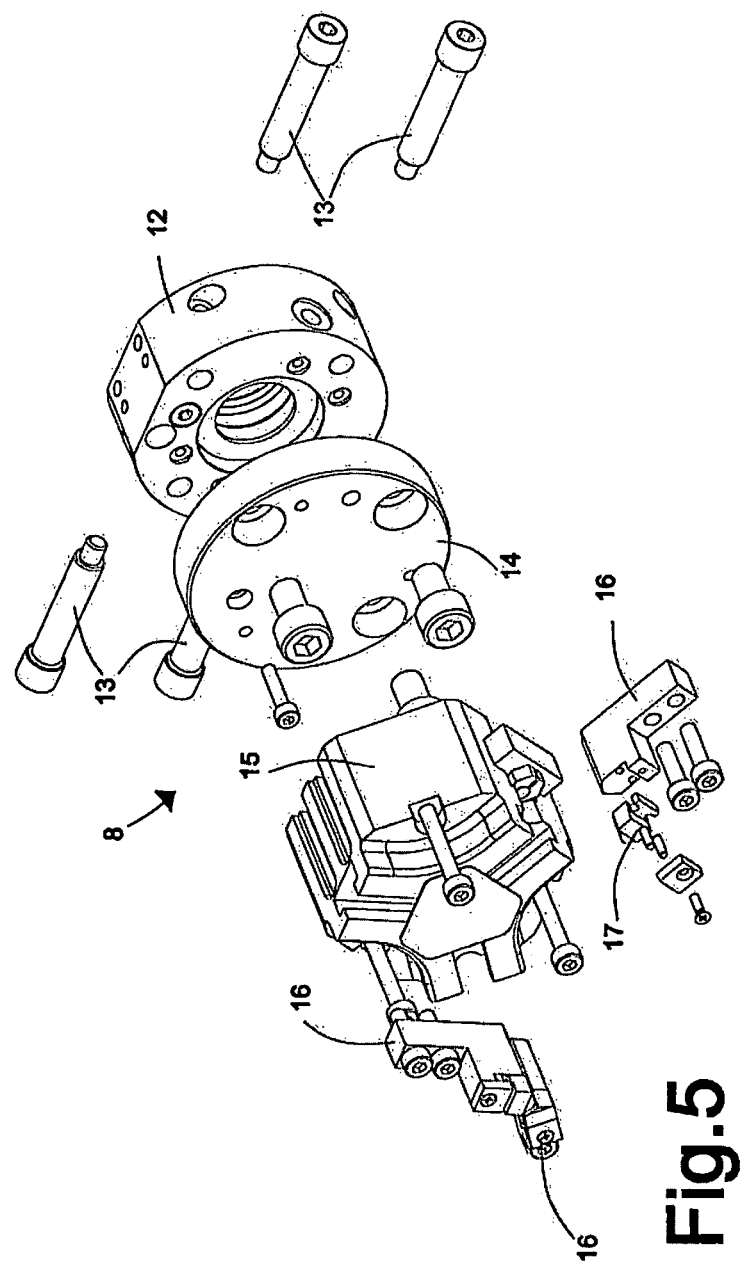

The gripper 3 is represented in particular in figures from 3 to 7c and includes from top to bottom (the reference is at the work position in alignment with the axis Z) a damper 7 (FIG. 4) and a pinching or gripping head 8 (FIG. 5) adapted to come into contact with the adhesive film and to remove it through pinching and lifting, without of course affecting the liner support underneath. The damper 7 has the function of ensuring that the head 8 exerts a pressure with constant intensity on the material to be worked, compensating for possible non-homogeneity in shape of the suction plane, and makes use of a pre-loaded spring 9 that elastically opposes the movement of a stem 10, through which the damper is connected to the head 8, the stem being slidingly supported inside a base cylinder 11.

The head 8 moreover comprises an annular tool-holding flange 12 that can be coaxially connected in a reversible manner, with a quick fit system that can be driven pneumatically, at the aforementioned stem 10 of the damper 7. Once the flange is removed, it can be supported in a suitable manner on a tool changing station (replacement of jaws 16 and/or blocks 17 as detailed further on) through four pins 13 projecting radially from the flange itself. A support disc 14 is connected to the flange 12, again coaxially, on the opposite side of the stem 10, said support disc being in turn the support for a pneumatically driven self-centring chuck 15 equipped with three radial jaws 16 provided with respective pinching blocks 17 which represent the actual manipulation element of the film/weed to be removed.

Figure 6:
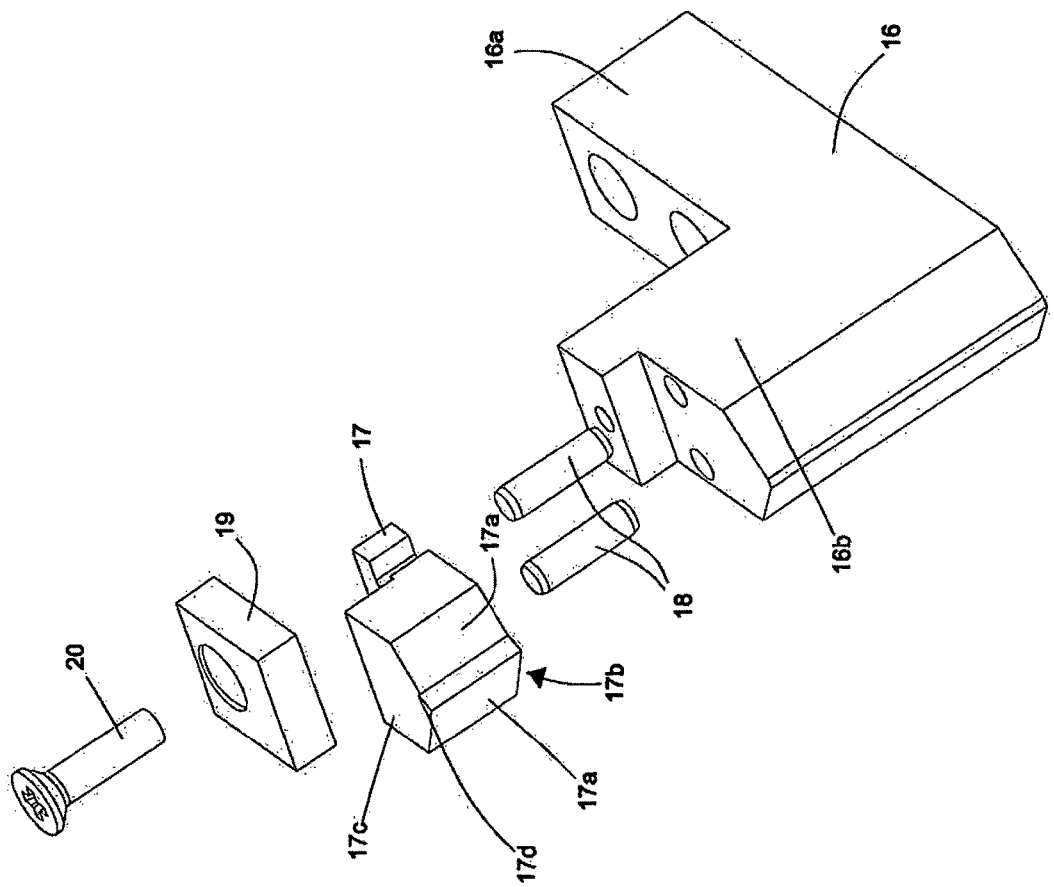
FIG. 6 is an exploded view of a radial jaw of the pinching head of FIG. 5.

The jaws 16 are thus driven by the self-centring chuck 15 that, when considered as such, has known mechanical characteristics. Through a base 16a of each jaw 16 the same jaws are linked with the chuck (FIG. 6); from the base 16a a strut 16b projects, and at the free end of the strut 16b a relative pinching block 17 is supported, preferably obtained through electric discharge so as to ensure a perfect mutual adherence of the three blocks when the self-centring chuck, and therefore the jaws, take up a radially locked end stop position (closed position).

The block 17 is kept aligned by two pins 18 that prevent the sliding along the axis X and Y, whereas the sliding along the axis Z is prevented by a plate 19 held by a screw 20.

Figure 3:
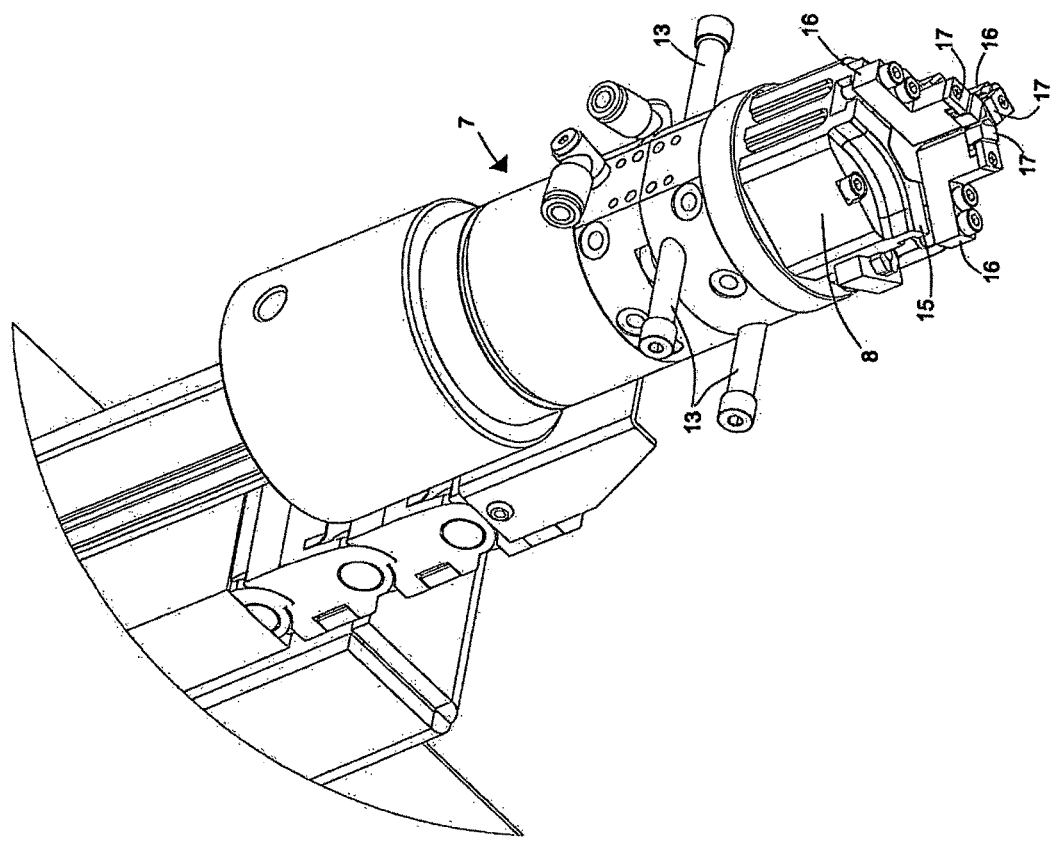
FIG. 3 is an axonometric view from below of a gripper of a fine weeding device that according to the invention is included in the apparatus.

Entering in greater detail as far as the shape of the pinching blocks 17 is concerned, said shape being particularly meaningful for one aspect of the invention, each block has two front facets 17a that extend parallel with respect to the axis Z, separated by an edge 17b, forming an angle, measured on the plane XY, of 120°. Those are indeed the faces that, by projecting frontally with respect to the strut 16a of the jaw 16, come into contact with one another causing the stop in the aforementioned closed position (shown in FIG. 3). The front facets 17a extend further in the direction Z at the lower side (the free one or pinching one) defining, in cooperation with an inclined wall 17c, a pyramid shaped projection at the top of which a contoured prism-like tip 17d forms the "finger" for gripping the material. Such a tip has an elevation, measured along the axis Z and with respect to the inclined wall 17c from which it branches off, in the order of some tenths of a millimeter, for example five, enabling it to sink into the adhesive plastic material without damaging the liner of silicone release paper underneath.

Figure 9:
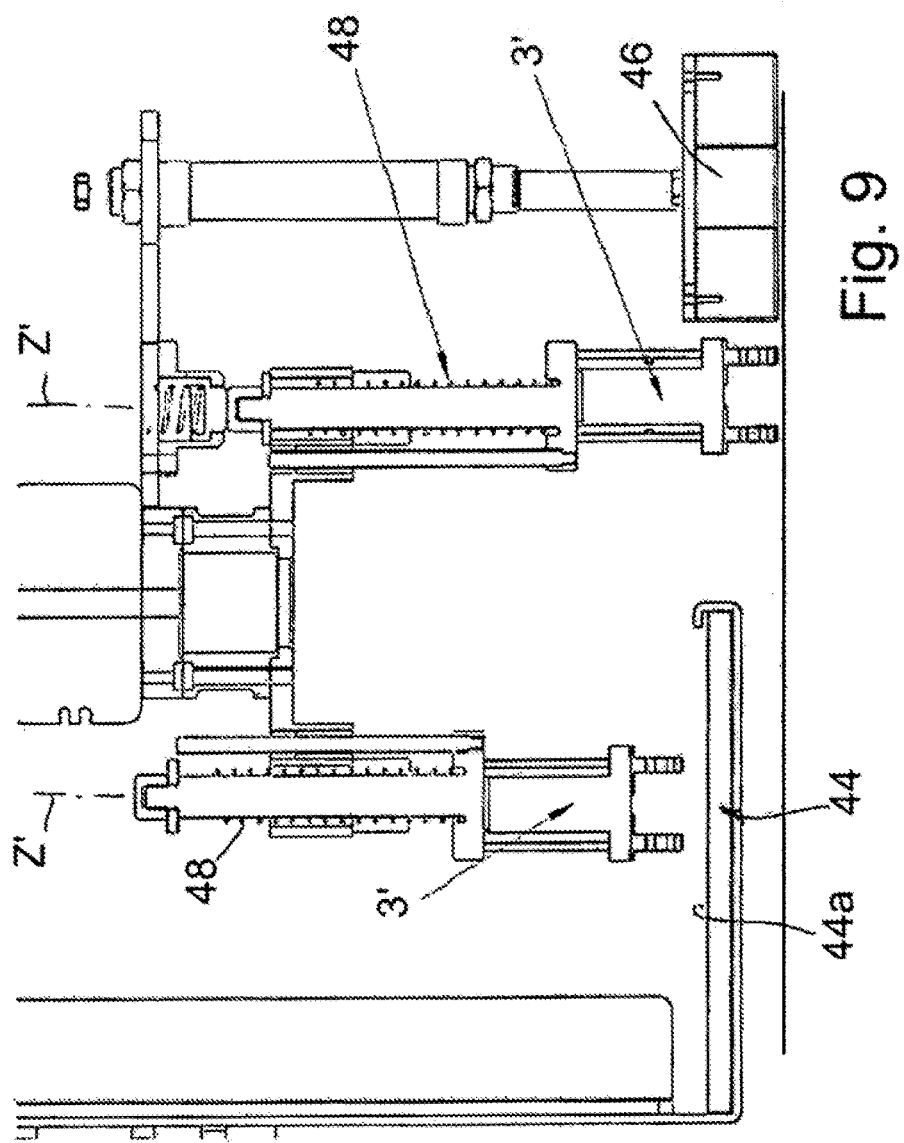
Figure 15:
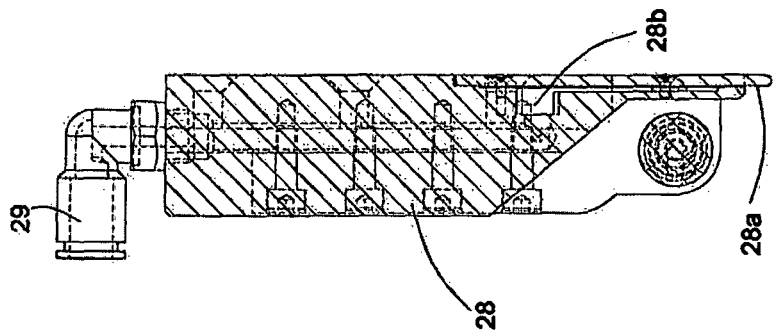
Figure 16:
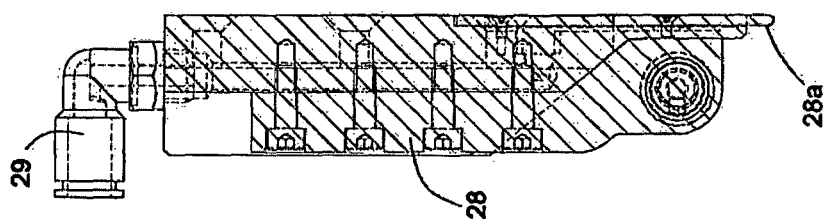
Figure 17:
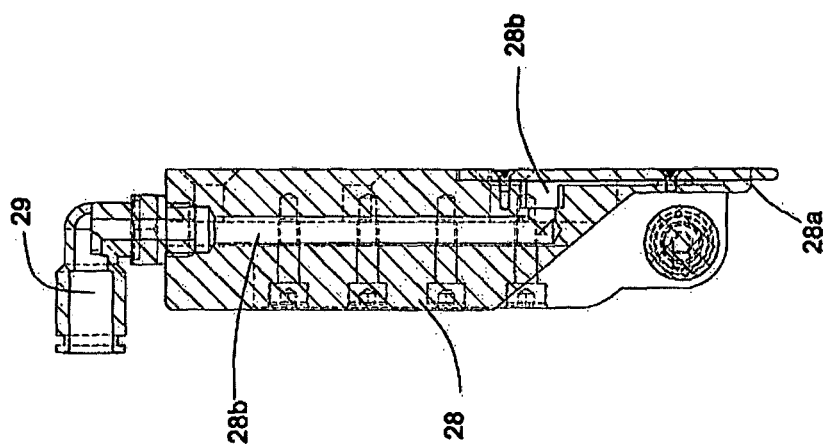

According to an embodiment shown in FIGS. 8 and 9, the fine weeding device comprises two or more grippers 3' that are supported in a carousel arrangement that allows for a greater work speed by hiding a discharge step of the weed pinched by a gripper, with respect to a fine weeding step carried out by another gripper. In the figures two grippers 3' can be noticed, mounted on a revolving support plate 41 that is driven into rotation around the axis Z (that in this case is no longer the central axis of a single gripper, but the axis of the gripper system as a whole), by an actuator 42. Moreover, the linear actuation system along Z is here indicated at 43. A shelf 44 can be also noted, supported by the crosspiece 5 and offering to the grippers 3', in their proximity, and in particular to the inactive gripper, the possibility to unload the weed previously pinched. Finally, a video-camera 45 and a lighting device 46 are represented, these additional components advantageously assisting the control of the fine weeding process, ensuring a correct centering of the sheet to be processed and a consequent high precision on the pinching points previously determined by the strategy set by the control software. Besides, the reference marks on the sheet can be focused and the conformity of the material to a standard quality evaluated, so that possible defective pieces are traced and do not proceed further to the weeding process.

The operation of this embodiment can be easily appreciated in particular from FIG. 9, that shows how in this case the support of the grippers 3' by the plate 41 is carried out with a further linear degree of freedom, according to directions Z' parallel with the axis Z. Such further degree of freedom is related with the weed unload function that indeed requires a reciprocating motion of lifting and lowering the gripper so as to leave the weed over the shelf. A elastic pusher 47 is secured with the plate 41 and acts on the tail of the gripper 3' in the pinching position to calibrate the force applied in the pinching step. Two springs 48 are associated with respective support guide for the reciprocating motion of the single grippers 3', being urged between the same grippers and the plate 41 in order to compensate for the variations in height due to the elevation of the weed collection plane (defined by the shelf) and to the accumulation of removed weed.

Particular self-adhesive, materials may require, for a correct unloading, the provision of an air ejection through a nozzle (not shown) placed close to the jaws of the gripper and turned on as the weed is brought into contact with the unload surface, preventing that some parts may adhere to the surfaces of the gripper.

In operation, each fine weeding step thus occurs, in brief, with the positioning of the gripper on the appropriate coordinates XY, the jaws being in the open configuration. The device then goes down along the axis Z closing the jaws in a synchronised manner in order to complete the run as they come into contact with the weed to be removed, which is thus gripped between the tips 17d that are mutually tightened. This action causes there to be a first detachment of the weed, the removal of which is completed with a new lifting, not necessarily exactly vertical, in some cases and preferably preceded by a displacement along XY. By using the embodiment with the carousel arrangement, a new step as the one here just described is carried out getting rid of the waiting step necessary to the unload of the pinched/removed material, because the rotation of the plate 1 makes a free and active gripper immediately available while the other one unloads the material on the shelf 44, possibly provided with an adhesive, weed collection belt as indicated by the reference numeral 44a. In the absence of a carousel system the single gripper can carry out the unloading or discharge over a sliding belt made from consumable plastic or paper material, with an obvious configuration which is not shown.

Once the fine weeding phase is over, the sheet proceeds over the plane 1a and thus enters the already mentioned rough weeding station M in which a weed seizing head 21 of a rough weeding device operates (figures from 12 to 18), cooperating in an initial phase with a cutting unit 22 (FIGS. 10 and 11). The rough weeding device has the configuration of a crosspiece arranged along the axis Y above the plane 1a and it is supported in a mobile manner along the axis X by a lateral guide system 1c of the plane itself. An adjustment of the position along the axis Z can be also provided, through for example abutment screws to be actuated manually.

The seizing unit or head 21 comprises a front suction rod 23 that takes hold of the sheet and positions it above the cutting unit 22, embedded in the plane 1a in an inlet position of the rough weeding station M. In this phase, the suction system of the rough weeding head 21 carries out an opposing effect to the action of a blade housed inside a self-lubricating disk 27 that moves along the axis Y, controlled by a pneumatic piston, through a recirculating ball slide on the entire length of a linear guide 24. The liner of silicone release paper placed under the self-adhesive plastic material is cut for its entire width at a distance of around 2.5 cm from the front edge of the sheet, so as to define a flap or edge that can be easily folded upwards, with the consequence and the aim that shall soon become clear. The precision with which the blade sinks into the liner is ensured by a micrometer screw, whereas the stop abutment of the knife is ensured by a pneumatic piston 25 that brings the disk 27 in contact with the supporting plane of the sheet. The gap on the axis Z between the knife and the disk thus defines the depth of the cut.

Once the liner has been cut, the sheet still held by the suction rod 23 is brought inside the actual rough weeding station M, making the cutting line of the liner coincide with a reference mark of a device for lifting the head flap of the liner. Such a device is schematically represented and indicated with reference numeral 36 in figures from 19b to 19l, and it consists substantially of a bar that can be lifted along the axis Z through linear pneumatic actuators that are not represented, between a lowered position in which it is concealingly integrated inside the plane 1a and a raised position in which it is capable of folding upwards by 90° the front flap or edge of the sheet, defined by the cutting means indicated above.

The lifting strip is preferably shaped with a staggered or comb-shaped edge that engages with a matching shape of the rough weeding plane, so as to lift the flap or edge at the end margin of the suction area, i.e. with the suction that is in any case active between the teeth of the staggering/comb and assists a lift precisely by 90° of the flap or edge.

A further component of the weed seizing head is a blower 28 that, on a plane that is parallel and adjacent to the plane 1a, produces an ejection of pressurised air that is capable of covering the entire width (direction Y) and is directed according to X, in a direction that is in accordance with that along which the sheet advances forward. Advantageously, the blower 28, shown in particular in figures from 13 to 17, takes the shape of an elongated blade extending along the axis Y with a plurality of adjacent and independent sectors, for example ten, that are driven by respective solenoid valves 29 in order to dispense air, through suitable channels 28b, during the movement of the sheet only where actually required.

The pressurised air comes out from a system of front slits 28a of the blower, to which a pair of rollers 30, 31 are associated, spaced along the direction X and arranged so that the blade is substantially tangent with respect to them. More precisely, a rear roller 30 is made from silicone material, whereas a front roller 31 is preferably made from aluminium with a non-stick coating and is mobile towards and away from the rear roller 30. The rotation of such rollers is controlled by, and is synchronised with, the forward movement of the whole head, through a pinion and rack transmission (the pitch of the rack being in particular the same as the diameter of the two rollers).

In an upper area of the group, and therefore above the components described above, there are a pull drum 33 with an incomplete development (that is, without a circular sector preferably having an angle that is equal or slightly lower than 90°) and above the drum 33, a shaft 32 for collecting the weed in a reel (around a core of disposable cardboard), both motorized and arranged with their rotation axis extending along the axis Y. The motorisation of the roller and the shaft is mutually independent, with a torque limiter that can be set in order to ensure the correct tension of the weed, thus avoiding ripping or accumulation thereof. The winder 32 can moreover translate towards and away from the pull drum 33.

The incomplete pull roll, indeed thanks to its C-shaped section, defines a radial face 33a that cooperates with a clamp member 35 so as to be able to lock the weed and pull it.

Figure 19A:
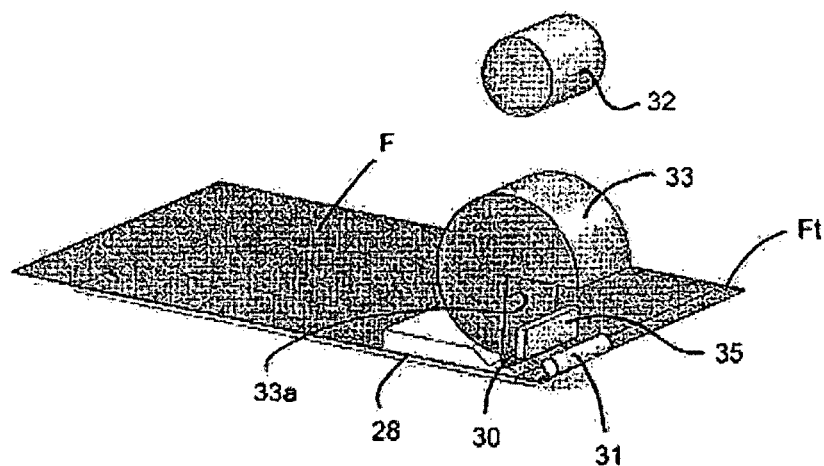
Figure 19B:
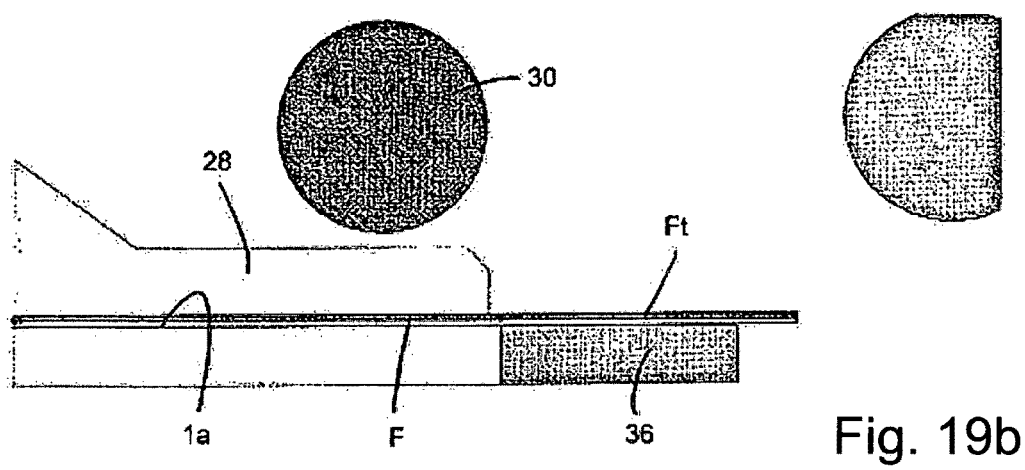

Entering into greater detail as far as the work sequence of the rough weeding process is concerned, and with particular reference to figures from 19a to 19l, the blower blade 28 is positioned at the front edge of the sheet, indicated with F. In FIG. 19a it can be noted also the folding flap Ft indeed generated frontally as a result of the half-cut previously mentioned (cutting line indicated with L). Initially, the radial face 33a of the C-shaped drum 33 is arranged perpendicular with the plane 1a, tangent to the back roller 30 and substantially aligned with the cutting line L. Also the front margin of the blower blade is positioned precisely in a way such as to coincide with the cutting line L. The clamp member 35 is open and the front roller 31 is in a forward displaced position (FIGS. 19a and 19b).

Figure 19C:
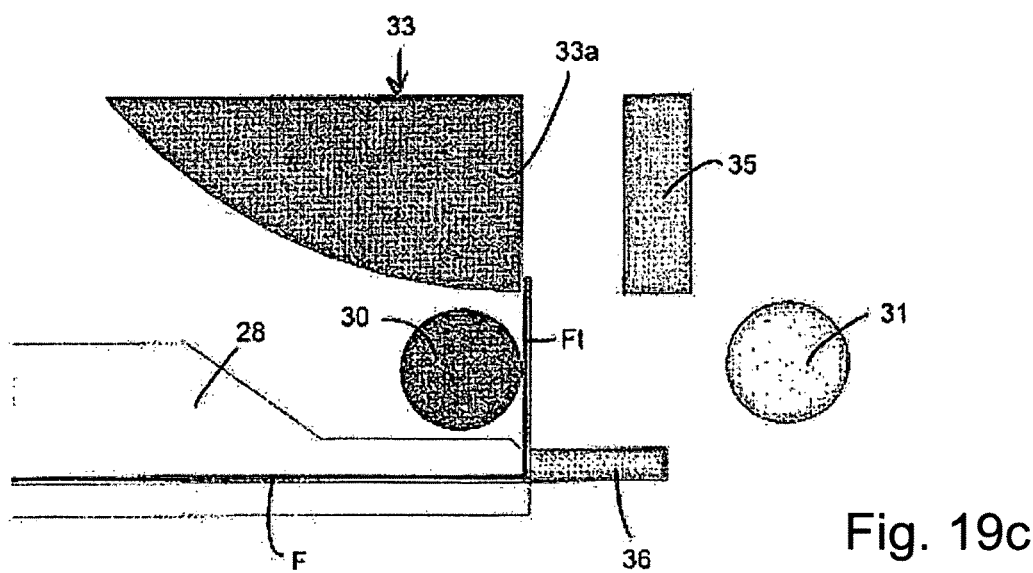
Figure 19D:
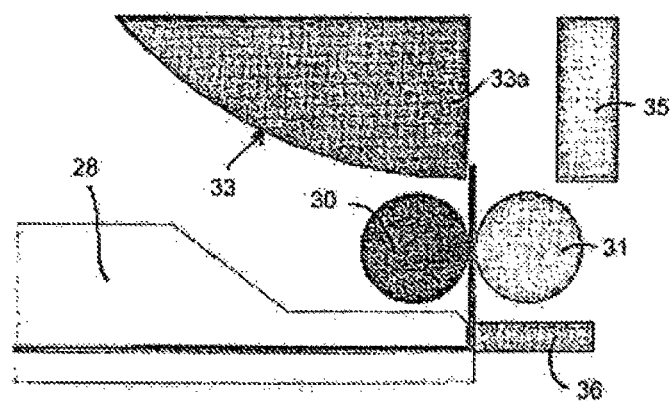
Figure 19E:
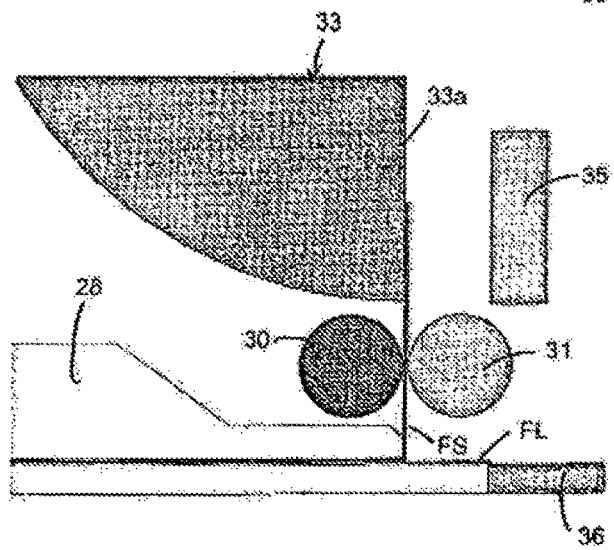

As a result of the lifting of the folder 36, the folding flap Ft, including both the weed Fs and the liner Fl joined to one another, is folded upwards (FIG. 19c). At this stage the front roller 31 retracts (FIG. 19d) and in cooperation with the rear roller 30 seizes the material, in contact with the adhesive side and directs it upward, whereas, at the same time, the head retracts in direction X, in opposite fashion to the advancement motion of the sheet (FIGS. 19d and 19e). While this occurs the weed Fs starts becoming detached from the liner of silicone release paper Fl, with the latter kept in contact with the plane 1a thanks to the suction exerted by it and to the jet of the blower 28 which is responsible for the function, useful in some cases, of preventing the lifting of small parts belonging to the graphics and that must indeed stay placed on the liner.

Figure 19F:
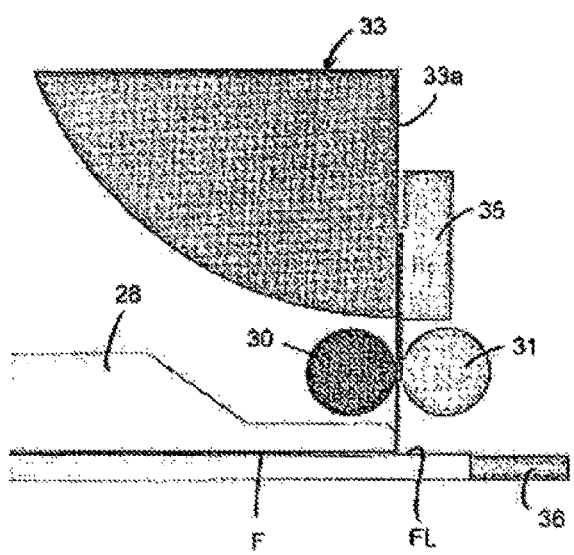
Figure 19G:
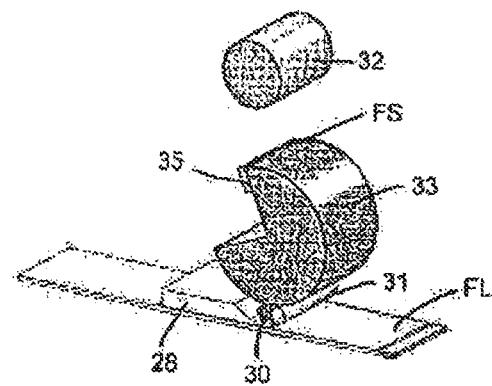
Figure 19H:
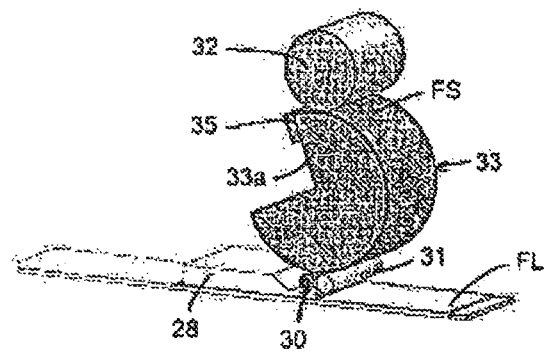
Figure 19I:
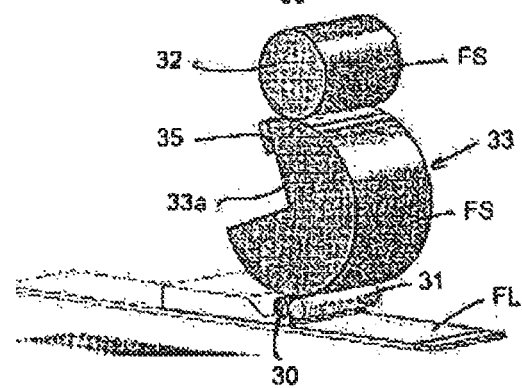
Figure 19J:
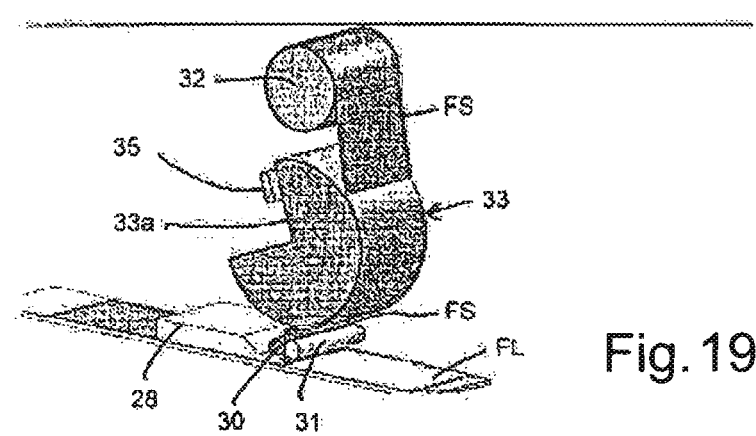

As visible from FIG. 19f, the weed Fs has been fed onto the radial face 33a of the pull drum 33 and the clamp member 35 can close to lock it. A rotation of the drum 33 at this stage continues the removal of the weed Fs which is circumferentially wound around the roll, while in a coordinated manner, the head unit continues to move rearwards. The rotation also brings the weed to the shaft 32 bearing the winding core. In order to start collecting, the shaft 32 moves tangentially alongside the drum 33 (FIG. 19h) so as to be, in turn, wrapped up by the same weed (FIG. 19i). Once the winding has been triggered, the shaft can lift up so as to allow it to freely expand its diameter (FIG. 19l). Of course, for each treated sheet, the aforementioned sequence is repeated and the reel of collected weed continues to grow. Once the diameter of such a reel has reached a set size, a sensor detects it, and stops the apparatus so as to allow the reel itself to be extracted and replaced with an empty cardboard core.

Once made clear that the blower is not necessarily turned on in every circumstances (being it possible that with some materials under treatment the effectiveness of the result is not jeopardized by a lack of the pneumatic action), in a different embodiment, shown in figures from 20 to 23, the seizing head is provided with a movement of lifting/pulling the weed along the vertical axis Z, movement that in practice replaces the rotation of the rollers 30, 31 and the winding over the pull drum 33, and by the same roll, in the first embodiment above described.

The seizing head in this case is indicated with the numeral 121, and is arranged, in structure and working process, in an analogous fashion with respect to the first embodiment as far as the initial steps are concerned (positioning the sheet and "half cut"). Accordingly, a further description of these steps is here omitted. The figures show a number of components that correspond to those of the previous embodiment, and are therefore indicated with a corresponding numeral in three digits (e. the suction bar 123).

The flap obtained with the "half cut", connected to the rest of the sheet only via the plastic film, is therefore the seizing point that allows for the start of the detachment of the weed, to "free" the graphics. For the sake of a correct working, it is important that the processed sheet be positioned precisely on the suction plane, so that the rear cut results exactly on the folding/lifting line of the flap in the cutting unit; to this purpose the hold carried out by the suction system is kept active during the whole process, to have an appropriate reference for the displacement of the sheet from the half-cut zone to the rough weeding zone.

A blower blade is in this case indicated with the numeral 128 and, suitably turned on by electrovalves, can deliver air during the movement only when and where positively required; the function of this air ejections is as mentioned fundamentally to oppose a possible lift of the graphic parts as the weed is removed. The structure of the blade has a certain flexibility to better accompany the sliding of the removed material and the interaction therewith even when it follows irregular geometric contours due to the particular graphic under process.

An idle roller 139 is associated to the blade 128 and is preferably lined with a silicon material in view of a better grip on the plastic film, In fact, the task of this roller is to lock the sliding of the sheet during the rough weeding process, ensuring a safer hold on the same sheet by the suction plane. Moreover, the compression of the drum on the self-adhesive material ensures that the graphic figures remain attached to the support liner and consequently prevents their lifting/removal as the weed is detached.

The unit including the blade 128 and the roller 139 is mounted on a common movable support 137, the position of which can be adjusted in the direction Z thanks to recirculating ball linear sliders 138 driven by pneumatic pistons. The result thus obtainable is to drive with a certain adjustable pressure the blade and the roller onto the material during the weeding steps, and to lift the blade in the inactive steps, that is when the unit must be moved without engagement with the sheet material.

The seizure of the weed occurs via plate members 131 seizing the lifted flap and moving upwards, carried by a slider 141, rising continuously in height along the direction Z, guided by a portal 140 and namely by linear guide means 140*a* thereof. The rising is coordinated with the movement of the same portal along the direction X (movement that occurs as in the previous embodiments, and followed by the support 127 of the blade 128 and of the roller 139 that, contrary to the seizing means 131, remain adjacent with the working plane pressing the sheet). As a function of the different types of material under treatment, it is possible to set the appropriate weed removal strategy by synchronizing the two movements, so that a constant and precise pull of the material is ensured during the whole process as required by the different shapes of the graphics. Depending on the length and nature of the material, it is possible to leave a small portion of the sheet anchored for avoiding fluttering during the movement, thus assisting the subsequent phase of collection of the removed weed.

In this case the collection of the removed weed is carried out by a collection unit 132 (FIG. 23) that rises in height along with the slider 141 on the guide portal, starting from a minimum elevation that is the one the slider has to reach to start the collection. The collection unit 32 comprises two mutually opposed rotating plugs 132*a*, one of which is motorized, that form the shaft on which there is engaged the weed reel cardboard core. The increase in width that results from the accumulation of weed on the collection core is compensated thanks to a horizontal recovery movement (along X) by the plugs 132*a*. The winding movement is obtained thanks to the motorization of one of the two plugs, possibly with a motor with feedback control through an external encoder. Once the width of the reel of wound weed has reached a customizable preset size, an onboard sensor of the slider commands the stop of the apparatus and the replacement of the core, which is permitted thanks to a pneumatic unlock of the non-motorized plug 132*a*.

The various drives are carried out through motors and actuators having an obvious nature to the skilled person and not described in detail.

The other above mentioned aspect of the invention will now be focused, i.e. identifying and carrying out a plurality of weeding assisting cuts, before performing the weeding operations as described above.

In order to carry out such a working step, a specific procedure has been developed that is capable of analysing, through processing means that are integrated with or associated to the actual apparatus, the graphical characteristics of the material being worked, and in particular of the weed, of intervening with preliminary assisting cuts, and of transmitting information/instructions to the control system of the apparatus, in particular to the fine weeding device to guide the positioning of the gripper and the consequent pinching points of portions of weed defined by the aforementioned cuts, with the aim of simplifying as much as possible the work of the apparatus, avoiding stress being exerted on the material in the weeding phase, so as to prevent it from being ripped.

Algorithms have moreover been implemented that can be easily adapted to any type of geometry, and that are capable of determining assisting cuts in accordance with the lines of force dictated by the weeding direction so as to minimise the stress transmitted to the material being processed.

The primary functions carried out in the process are thus those of:

importing a graphic file into a processing unit;

analysing the geometries present in such a graphic file;

calculating the cuts to be added, and according to these, letting the user decide (or suggest) the most advantageous weeding direction;

exporting a new modified vector file, to be used by cutting apparatuses.

Additional functions, that are not less important, are those that make it possible to export further information to be sent on to the central control unit of the apparatus (like for example a PLC), wherein such information will be exploited, as already mentioned, to drive the movement of the weeding devices, but also to selectively activate certain operations (like for example the selective actuation of the air jets).

The files imported into the processor, representing images of the graphic configuration of the sheet to be treated, are preferably vector file types, such as for example files having extension .dxf; however, other extensions are possible.

Hereafter there will be described in detail, as an example, i.e. according to a preferred embodiment, the various operational steps.

Once the file has been loaded, the data concerning the geometries therein are imported and a dedicated algorithm controls the integrity of the data and removes double geometries or single dots that have been entered by mistake.

Based upon such data, the individual lines forming the graphic figures are approximated, with polygonal structures (using for example the known SPLINE interpolation). At this stage the file is displayed on a graphical interface.

In this step the user can decide whether to exclude from the processing some of the figures that for functionality or for convenience were inserted in the sheet, but that do not require being cut by the plotter. It is also possible to exclude or reinsert a certain figure.

Once a portion of the sheet to be read has been selected, the algorithm identifies the entities that are inside the area and verifies whether these are part of a repeating block. Indeed, in the case in which there are repeating blocks on the sheet, the algorithm checks only one block, and the results are extended through analogy to the rest of the sheet. This makes it possible to substantially reduce computation time and unexpected malfunctioning of the system.

A recursive algorithm 38 (shown in FIG. 24) then verifies whether a certain entity is inside another one and in how many figures it is contained. The algorithm 38 considers the entities contained in the repeating block (or all the elements of the file), initialises them at "LEVEL 0" and places them in descending order based on their surface area. Then, for each entity that is different from the first, it is established whether it is inside or outside the one with greater area and the function is restarted in a recursive manner on each of the two groups thus obtained. Only if the entity is inside another one, its level is increased and the entity containing it is stored. Here, it is worth underlining that all the flow charts represented in the figures representing respective algorithms or parts thereof are to be considered as incorporated in the present description. Insofar such charts are self-explanatory, they shall not be described in further detail.

Once the aforementioned algorithm 38 has been executed (when all the entities have been examined and the "inner" and "external" groups are empty) an element that is not contained in any other group is defined as "LEVEL 0", whereas all the entities contained in it as "LEVEL 1" and so on until an element is reached that does not contain any other (maximum level).

As a supplement to the previous algorithm, a second algorithm follows completing the data in the case in which the repeating block of the previous point has been selected, and then a third algorithm identifies, for each entity, how many and which ones that are greater by a single level, are present inside it.

The information thus obtained is fundamental in a fourth algorithm 39 (represented in FIG. 25), retrieving the parts of weed to be removed that already present inside the file (like for example the inside of an "A" or of an "O"). Such a fourth algorithm (or PlotLevels algorithm) identifies as the internal weed part to be removed the area comprised between an entity having an odd level and all the entities inside it of a level that is immediately above, or an entity with an odd level that does not contain others inside it. FIG. 26 highlights in a darker colour all the parts of weed to be removed present inside an example file.

At this point it is possible to determine and map cutting lines for dividing the main body of the weed, on the file, which in practice subdivide the areas of the native weed which after the first steps described above are excessively large (and could thus create problems during their removal). As shown in FIG. 27 the cutting function obtains the ends of the cutting segments that subdivide the area into different parts and the points of the scrap polygons that derive. The function also has the task of inserting additional cuts so as to divide the parts of weed derived by a difference of areas into separate polygons.

Concerning now the addition of the properly called assisting cuts, substantially two approaches have been developed: a first one consists of determining the so-called global cuts, or rather, those that are carried out, between each figure, considering the entities as associated; a second one consists of defining the local cuts or edging cuts determined according to the geometry of each single graphical figure.

As far as the definition of the global cuts is concerned, in this phase the system substantially manages the problem of the undercuts that are formed between entities close to one another along the weeding direction by scanning the sheet in its entirety so as to establish whether it is necessary to add cuts between one figure and the next or inside groups of figures. By undercuts it is hear meant the portions of the sheet that, during weeding, can be critical since they can rip the sheet or tear the graphic design. They usually correspond to portions with particular geometry (convexity, changes of direction, etc) but their criticality also depends upon the weed direction and upon the type of material with which the sheet is made.

The search for the points between which a global weeding cut is to be inserted includes an initial phase in which, for every figure, it is determined how many and which other figures are close or adjacent to it. The structure of the algorithm that implements such an initial step is represented in FIG. 28.

The block B1 analyses all the entities present in the file and, based upon the result of the algorithm of FIG. 24 that identifies which figures are inside others, extracts only those that are on the outermost level ("LEVEL 0"). the intermediate blocks B2 and B3 calculate the barycentre of all the figures on that level and the relative distances between each of them. The fourth and last block of the algorithm of FIG. 28 uses the obtained data and builds a mapping at the outermost level indicating for each figure the number and which entities are close or adjacent in the weeding direction. In such a direction the algorithm moreover determines the free space that is indeed present for each entity.

In carrying out the aforementioned mapping each figure is associated to another according to the algorithm represented in FIG. 29.

The entity considered adjacent or closest is that which has the smallest space along a certain direction, calculated as the difference between the coordinates X or Y (according to the weeding direction) of the mutually facing ends of the two graphics.

The position of the entity is then identified, that is, it is determined whether the entity is completely opposed or partially opposed with respect to a close or adjacent entity: with the definition "completely opposed", in respect to a certain direction, it is meant that, when drawing two straight lines parallel with such a direction passing by the ends of the reference entity (points at minimum and maximum ordinate in the example of FIG. 30a), the opposed figure is intersected by both the straight lines. If the figure is not intersected by both the straight lines it is defined as "partially opposed".

The most suitable entities for the global weeding cuts are those that are "totally opposed"; on the other hand entities that are "partially opposed" are replaced by those having a barycentre at a minimum distance from that of the reference figure.

Figure 30A:
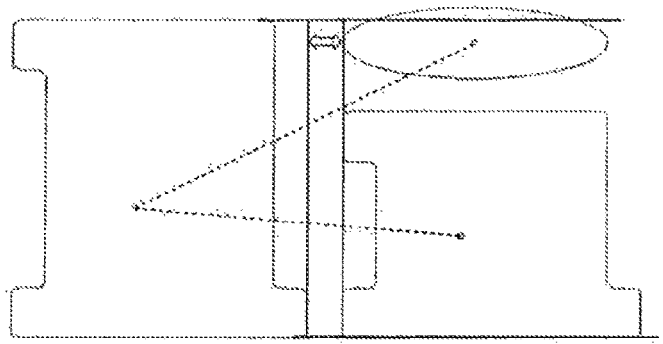

In the example in FIG. 30a (in which the letters "I" and "i" are represented) it can be seen how the opposed and closest entity to the letter "I" along the left-right direction is the dot of the "i" whereas the one with the barycentre closest is the stem of the "i". The algorithm initially reads the dot of the "i" and establishes that it is not completely opposed since one of the two straight lines highlighted in bold does not intersect the entity. Therefore the figure coupled with the letter "I" for carrying out the global weeding cuts is the stem of the "i", since it is the one with the closest barycentre.

Figure 30B:
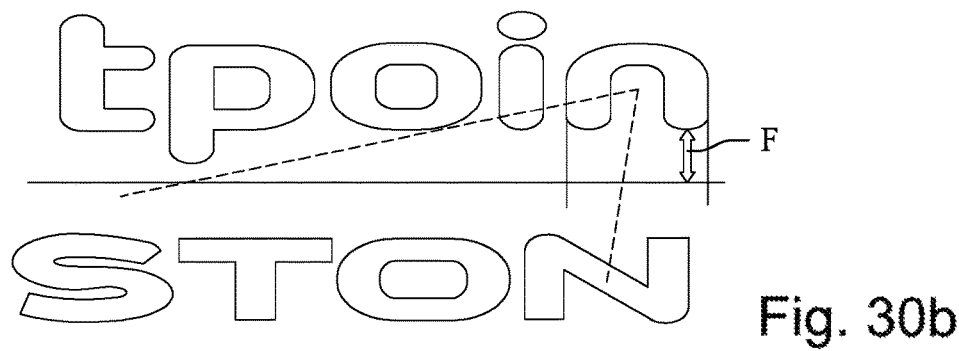

In the subsequent example (visible in FIG. 30b) it is possible to see how the figure to be considered the closest to the letter "n" at the top, along the top-bottom direction (according to the arrow F), is not the letter "n" below (which in any case has the closest barycentre) but rather the rectangle 39 placed between the two words that, in addition to being the closest figure, is also intersected by both the straight lines.

Figure 30C:
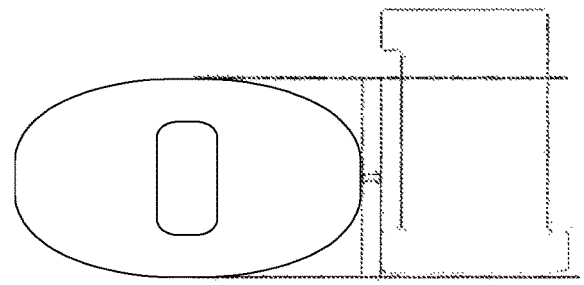
Figure 30D:
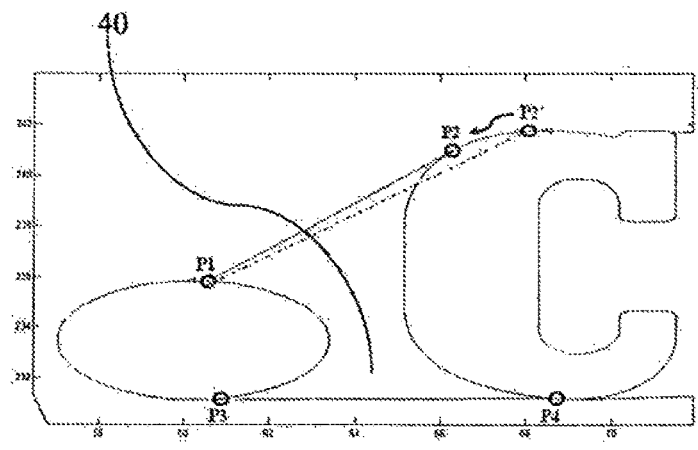

Next, in FIG. 30c an example is shown with a weeding direction from left to right (according to the arrow F). Considering the letter "O" on the left, inside the two horizontal half lines drawn starting from the points at minimum y and maximum y, the closest entity is the letter "I" which has the minimum distance both with its barycentre and with its minimum x.

Once all the couplings have been carried out there is the problem of dealing with some particular cases that occur, namely, if many entities identify one same entity as the closest one (like in FIG. 30b in which all the letters of the upper word identify the central rectangle), or if an entity has other entities with which to connect in addition to the closest, or even the case in which there are sets of three entities with one having dimensions that are much smaller with respect to the other two. Each of these particular cases is dealt with by dedicated sub-algorithms, and in this way the general mapping is completed indicating for each entity how many and which figures are to be considered coupled for the global weeding cuts to be carried out.

After this initial phase a fifth algorithm, based upon the previous mapping and the weeding direction, decides the points in which it is advantageous to insert a cut. Indeed, such an algorithm, for each couple or group of entities, identifies the points between which to carry out an additional cut (possibly adjusted so as to not interfere with the previous graphical element). Between two additional cuts and the two (or more) entities that are affected by the cutting, a new derived polygon is thus identified as schematically shown in FIG. 31.

For each figure on the outermost level, sub-algorithms receive as an input the points of the entities involved, and return as an output the ends of the segments representing the optimal cuts; the algorithm thus selects the initial points in proximity to the ends of the figures (in the example in FIG. 31 the points are P1, P2', P3, P4). In the case in which there is an intersection between the potential cut and one of the two entities, a new point is identified (in this case P2) that generates a cutting line that does not intersect the graphical element, i.e. a cutting line that is tangent with the edge of the figure.

Further sub-algorithms receive in input the coordinates of the identified cuts (P1, P2, P3 and P4) and the coordinates of the involved entities, and extract the points of the scrap polygon that derives, indicated in FIG. 31 with 40.

As far as the local cuts are now concerned, it should be considered that for very delicate materials the problem of accidental tearing occurs also for figures that have high discontinuity characteristics, in terms of angles between the weeding direction and the last side of the figure encountered going along such a direction. In order to solve the problem it is indeed provided to insert local additional cuts to edge the figures more regularly, so as to reduce the undercut angle and avoid tearing. All the figures that were not previously joined to other ones with the global cuts are thus analysed and the coordinates of the points from which to make the cuts start are searched so that these are substantially tangent to the figure.

The algorithm that carries out the local cuts on a single figure is represented in FIG. 32. The algorithm identifies a polygon that follows the convexity of the figure under consideration (indicated in the algorithm as "Convex Hull", corresponding to the known mathematical entity of convex envelope); the intersection of this polygon with the figure provides for the concavities, which are the most critical parts of the geometry during removal.

Once the concavities have been identified there is determined, on the basis of the weeding direction, whether they can cause the ripping of the graphical element in particular for their being undercuts, and therefore it is necessary to proceed with a relative closure or edging cut.

One of the parameters for evaluating whether a concavity is an undercut or not is that of determining the relative position with respect to the initial figure.

With reference to FIG. 33a, it can be understood that if the rough weeding direction is from left to right (according to the arrow F), the area identified with C1 will not cause problems at the moment of removal, since proceeding in such a direction the geometry of the figure follows the weeding direction; substantially no stresses are generated on the material, since they extend in the opposite or crosswise direction with respect to the direction imposed by the weeding operation, therefore there is no risk of tearing.

On the other hand, if the weeding direction is from right to left (according to the arrow in FIG. 33b) the area C2 undergoes a stress that is opposite to the weeding direction and causes the material to rip.

In order to identify the relative position of one part with respect to the initial figure, i.e. to determine in which position a certain concavity is and thus evaluate its risk of ripping during weeding, four points of the figure itself must be identified that correspond to the top left point, top right point, bottom left point and bottom right point, respectively; in FIG. 33c these points are indicated with:

UL (Up, Left)
UR (Up, Right)
BL (Bottom, Left)
BR (Bottom, Right)

Ordering the vector of the points clockwise, and ensuring that the BL point is in the first position, it is possible to establish the position of the concavity.

There remains now necessary to determine the geometry of the concavity that together with the relative position and the weed direction are the three parameters that make it possible to determine whether or not a certain area can be considered an undercut.

A sub-algorithm is thus implemented that classifies the concavities as regular or irregular on the basis of the position of key points, of the weeding direction and of the relative position that the object occupies with respect to the initial figure.

A practical example to be considered is given by the graph of FIG. 34a and in particular the area indicated in grey. The points P representative of such an area, i.e. those in which a change of direction on the axis X can be noticed, are ordered in the direction indicated by the arrows G in black. At this point the following matrix is constructed:

$$\begin{matrix} 1 & 1 & 1 \\ 1 & 0 & 0 \end{matrix}$$

The presence of 0 on the second row indicates that the arrangement of the representative points is not ordered, this meaning that when proceeding in the direction of the arrows from the point marked with P', the points encountered do not always follow a decreasing Y coordinate ratio. This imposes a further check on the coordinate X, that is on the first row. If the first row comprises all 1 symbols, it means that the points are arranged with ascending X and therefore when proceeding in the weeding direction F, stresses counteracting the movement will not be encountered. The investigated area is not therefore an undercut.

When considering now the area indicated with D in FIG. 34b, the points of which were ordered in the direction indicated with the arrow G, three representative points P are identified that lead to the construction of the matrix shown below:

0  1

0  1

Having 0 symbols on the second row indicates that the arrangement of the representative points is not ordered on the axis Y. Continuing the search on the first row, the presence of 0 indicates that the points are not ordered for the axis X either. Such an area is therefore an undercut.

With reference again to the algorithm of FIG. 32, if the area under consideration is an undercut a local cut is carried out. The presence of a possible global weeding cut is this verified. There is furthermore a further check that verifies that the cut made does not go over another entity and in order to increase the level of reliability of the system it is then foreseen for there to be the possibility for the user to insert or remove the cuts manually.

The process ends with the determination of the pinching points of the fine weeding gripper 3 selected on the basis of the position of the scrap portions to be weeded. The scrapes to be removed consist not only of weed parts natively existing inside the graphics, but also of all the weed parts generated as a result of the additional cuts. Based on the size and the shape of the parts to be removed, it will not be always possible to remove the material by simply pinching it at any point and moving the gripper vertically.

Entering into further details in connection with the aspect of deciding the pinching point of a fine weed part and the control of the movement of the pinching gripper, it should be noted that the algorithms searching for the additional cut patterns give as an output/result the coordinates of the extremities of the same cuts, and of the vertices of the resulting scrap polygons. With the aim of sparing the control system of the apparatus the execution of a significant number of operations (so that the working speed is improved), the choice of the pinching points can be directly carried out by the software on the processor that assists the apparatus, while the apparatus control system is left with the task of controlling the movement along the Cartesian axes and has only to read the above mentioned points in a interchange file (e.g. having a .iso format)

Firstly, a pinching point needs be chosen that permits a complete removal of the scrap portion with the subsequent movement of the gripper. Said point must be adapted to let the gripper tighten without interfering with other parts of the adhesive film that must indeed not be touched. In substance, one has to identify a circle having a radius equal to opening span of the gripper and that is completely within the figure to be removed. The determination of each most suitable pinching point can be implemented e.g. by the algorithm shown in FIG. 35; this identifies a circle with radius equal to the radius of action of the gripping head 8 that must be totally inside a scrap portion.

In the case in which the scrap is generated by one or more local cuts, the search of the pinching point of the gripping head 8 occurs firstly along the cuts themselves so that the circumference is tangent to the cut segment and inside the scrap. If it is not possible to find a circle that is totally inside the scrap surface it is necessary to decrease the working range (radial displacement) of the jaws 16 of the head, or rather, replace the pinching blocks 17 adapting their dimensions, and repeat the algorithm. On the basis of the size of the scrap and of the pinching point, the type of movement that the gripper 3 has to carry out in order to achieve the weeding is implemented. In FIG. 36 it is possible to observe the result following the execution of the algorithm: 42 indicates the scrap portions, PP indicates the pinching points and PD indicates the destination points of the movement of the gripping head.

In an alternative embodiment, instead of differentiating the identification of the pinching point depending on the fact that the scrap region is or not generated by supplementary assisting cuts, it is at first verified if the scrap figure under examination has some concavities or is simply convex. In fact, if it is convex and its surface area is comparable with the gripping surface of the gripper (for instance an area not greater than 500% of the pinching surface of the gripper), then the gripper is placed so as to pinch at the barycenter of the same figure.

If the previous condition is not satisfied, then a polygon is evaluated that circumscribes the figure. The polygon is divided into four zones (Top-Left, Top-Right, Bottom-Left, Bottom-Right). For each of these zones, there is evaluated the ratio of surface area that is occupied by the scrap, choosing the area with the highest occupation ratio, or in case of equal ratios the zone that it is first met, starting from the top left and proceeding clockwise.

Once chosen the area, the best point to pinch the figure is individuated, as above, along a cut/size of the figure.

As far as the exit trajectory of the gripper is concerned (once the scrap has been pinched), in case of barycentric pinch the same gripper can detach the scrap figure by simply accomplishing a vertical lifting motion, or in any case a motion that has a certain slant (e.g. 45°) that determines a component along Z. In case instead of a perimetrical pinch, a movement over the plane XY will be advantageously carried out, directed towards the barycenter, for an amount that is optimized depending on the material and the shape; the movement can also continue beyond the barycenter until the perimeter of the figure is reached and passed. Finally, the operation is completed with a lifting of the head.

Returning to the step in which the supplementary assisting cuts are made, an even further aspect is worth a remark. Not necessarily such cuts are directed to define some weed scrap structures with a closed polygonal boundary to be removed in the fine weeding step. Said cuts can also be single segments that always start from an edge of a graphic element, but end "blind", that is they stop in the main native weed without joining other cuts or edges. This kind of cuts are drawn in particular in correspondence with sharp corners formed by the graphic elements with the vertex that points opposite to the rough weeding direction, running on the main weed starting from said vertex in order to prevent that when the weed is detached (indeed during the rough weeding stage), an undesired detachment of the graphic may also follow.

The present invention provides therefore an apparatus and a method capable of making the weeding process effectively automatic (not necessarily in the time order rough after fine as in the example, but possibly even in the contrary order), remarkably to reducing the production times and significantly improving the productive results as far as costs and reliability are concerned.

The present invention has been here described with reference to preferred embodiments. It should be understood that that there may be other embodiments within the same inventive concept, as defined by the scope of protection of the following claims.

The invention claimed is:

1. A weeding apparatus for weeding of a multilayer sheet comprising:
a support liner and at least one adhesive film coupled with the liner, the film comprising a plurality of graphic elements peripherally encircled by cuts and a weed among said graphic elements, the apparatus comprising: a sheet support plane defining a sheet feeding direction (X);
a fine weeding device adapted to work on said sheet support plane to individually remove parts of the weed delimited by respective closed cut boundaries;
a rough weeding device adapted to remove in a single passage according to a rough weeding direction a unitary main part of the weed; and
control means adapted to acquire, receive, or store information on the shape and distribution on said sheet of said weed parts delimited by closed cut boundaries, and to control the operation of said fine weeding device as a function of said information,
wherein the apparatus further comprising weed analysis means and cutting means for analyzing the shape and distribution of said graphic elements, said analysis and cutting means being adapted to transmit said information to said control means, and
wherein said analysis and cutting means are adapted to map and execute weeding assisting cuts that cut the same weed intersecting with one or more edges of said graphic elements.

2. The apparatus according to claim 1, wherein said weeding assisting cuts comprise cuts adapted to increase the number of parts of the weed that are defined by closed cut peripheries, to be removed by said fine weeding device.

3. The apparatus according to claim 1, wherein said assisting cuts comprise single blind cuts in correspondence with respective sharp corners formed by said graphic elements, having a vertex pointing opposite to a removal direction followed by said rough weeding device.

4. The apparatus according to claim 2, wherein said analysis means is adapted to map on said weed, in sequence, distributions of global assisting cuts that run between different graphic elements, and distributions of local assisting cuts that edge single graphic elements.

5. The apparatus according to claim 4, wherein a search of points between which a global cut is to be inserted includes:
determining, for each graphic element, how many and which other elements are close or adjacent to the element;
identifying and characterizing the mutual positioning between the adjacent elements;
choosing for the execution of a global cut the space between two elements completely opposed to each other with respect to a predetermined direction said opposed elements being such that, when drawing two straight lines parallel with such direction and passing for respective ends of the reference elements, the other element is an element intersected by both lines;
replacing the elements that are partially opposed to each other, said partially opposed elements being elements not intersected by both said straight lines, with elements having a barycenter at a minimum distance from the barycenter of the reference element;
setting the end points of each global cut in proximity to ends of the resulting chosen couples of elements;
extracting and storing information on weed polygons to be removed resulting from the cuts.

6. The apparatus according to claim 5, wherein the mapping of said local cuts includes:
analyzing all the graphic elements that were not previously joined to other elements with any global cut;
identifying a complex envelope polygon of the graphic element under consideration;
retrieving the intersection of such polygon with the graphic element to obtain information on the concavity of the element;
determining if said concavity, on the basis of a rough weeding direction, can cause rips in the weed, or if undercuts are formed and so it becomes necessary to proceed with a local cut;
to this latter purpose, identifying four points of the graphic element that correspond respectively to the top left point, top right point, bottom left point and bottom right point;
ordering clockwise the vector of the points, so that the bottom left point be in first position, to determine the position of the concavity;
determining and analyzing points of the periphery of the concavity wherein a change of direction with respect to a reference axis can be noticed, to establish the geometry of the concavity;
determining, as a function of the result of the previous steps and of the rough weeding direction, the concavity areas in undercut arrangement; and
for each area of concavity in undercut arrangement, carrying out a local cut.

7. The apparatus according to claim 1, wherein said analysis means are adapted to identify pinching points where the weed parts are to be pinched by said fine weeding device, said fine weeding device having a determined working span, so as:
once set a circumference on a basis of the working span, choosing parts having a sufficient extension in relation with such circumference;
if a part has a concavity, choosing the pinching point along boundary cuts of each part such that the circumference be tangent to said boundary cuts and internal to the weed part to be removed; or,
if a part has a convex shape, choosing the pinching point in a substantially barycentric position.

8. The apparatus according to claim 7, wherein based on the size of the parts of the weed to be removed and on the pinching point, said analysis means are adapted to retrieve and transmit control information on the movement that the fine weeding device has to carry out for weeding the sheet, said control information including, in case of a barycentric pinching a lifting movement away from the sheet support plane or, in case of a peripheral pinching, a displacement over the plane towards the barycenter a graphic element under consideration and then a lifting for the removal.

9. The apparatus according to claim 1, wherein said rough weeding device comprises:

a seizing head extending above said plane along a transverse direction (Y) crosswise with respect to said sheet feeding direction (X)

support and drive means adapted to drive said seizing head at least according to said feeding direction (X), wherein said seizing head is adapted to emit a pressurized air ejection substantially parallel with and adjacent to said plane with an ejection direction concordant with said feeding direction (X), and comprises seizing means comprising in turn at least one pair of seizing members adapted to seize said weed, whereby a relative motion between the seizing head and the sheet is adapted to detach the weed from the support liner, said air ejection providing for a stabilization and control of the weeding action, the device further comprising cutting means arranged along said transverse direction (Y), flush within said plane and adapted to cut only the supporting liner to realize a sheet flap foldable upwards, to assist the engagement with said seizing head, and folding means associated with said cutting means and adapted to be lifted from the plane in order to fold said flap.

10. The apparatus according to claim 9, wherein said pressurized air ejection extends over the whole width of said plane concordantly with the sheet feeding direction, due to an elongated air ejection blade with a plurality of side by side sectors controlled by respective electrovalves adapted to be operated selectively and independently.

11. The apparatus according to claim 10, wherein said seizing head comprises a slider supporting said seizing members, the slider being movable on linear guide means along a direction (Z) orthogonal with said plane, said linear guide means being defined by a portal that rises from the plane and is movable with respect to the plane according to said feeding direction (X), dragging therewith said blower blade.

12. The apparatus according to claim 11, wherein an idle roller is associated to said blade, adapted to press the sheet against said plane.

13. The apparatus according to claim 11, wherein said portal further supports in a movable manner along said linear guide means a weed collecting unit for collecting the weed detached by said seizing members.

14. The apparatus according to claim 1, wherein said fine weeding device comprises:

a gripper with a pinching head having an axial-symmetric development around a central axis (Z, Z'), the head comprising a plurality of self-centering jaws radially movable close to and away from said central axis (Z), and respective pinching means adapted to pinch portions of said weed, mounted on said jaws, wherein said pinching means comprise for each jaw respective blocks having front facets, protruding frontwards from the corresponding jaw, adapted to match in mutual contact between the different blocks in a closed position of the head, said front facets having an axial extension such that, in cooperation with a slanting wall of the block, a pyramidal projection is formed with a shaped prismatic tip for gripping the weed.

15. The apparatus according to claim 14, wherein said tip has an elevation, measured along the axis (Z) of the device and starting from the slanting wall from which the tip branches off, comprised between three and eight tenths of millimeter.

16. The apparatus according to claim 1, wherein said pinching head is mounted on a damper adapted to ensure the exertion of a constant pressure on the material to be worked, the damper comprising elastic means elastically opposing the movement of a stem to which said head is connected.

17. The apparatus according to claim 14 comprising: said sheet support plane; support means for said gripper adapted to keep the gripper substantially orthogonal with said sheet support plane; drive means adapted to move said pinching head in a Cartesian orthogonal system (XYZ) defined by said plane and by said central axis (Z) orthogonal with the plane.

18. The apparatus according to claim 17, comprising two or more grippers arranged in a carousel fashion to hide an unloading step of the removed weed by a gripper in an unloading position, with respect to another gripper in a pinching position, shelf means being further provided, integral with said support means and arranged close to said to collect the unloaded weed.

19. The apparatus according to claim 18, wherein said carousel arrangement comprises a revolving plate driven into rotation around an axis parallel with said central axis (Z') of each gripper by actuation means, said grippers being mounted on said revolving plate with a linear reciprocating degree of freedom along the respective central axis (Z') of the grippers.

20. The apparatus according to claim 19, comprising an elastic pusher secured with said plate acting on a tail of the gripper in a pinching position to calibrate the force applied in the pinching step, springs being arranged between the grippers and said plate in order to compensate for the variations in height between said pinching position and said unloading position.

21. The apparatus according to claim 14, comprising an adhesive belt for collecting the unloaded weed.

22. The apparatus according to claim 21, wherein the adhesive belt is slidable.

* * * * *